United States Patent
Zhang et al.

(10) Patent No.: US 12,412,572 B1
(45) Date of Patent: Sep. 9, 2025

(54) SKILL SESSION BACKGROUNDING AND RESUMPTION

(71) Applicant: Amazon Technologies, Inc., Seattle, WA (US)

(72) Inventors: Xu Zhang, Bothell, WA (US); Nikhil Gupta, Shoreline, WA (US); Pranav Kumar Singh, Seattle, WA (US); Sabrina Chandrasekaran, Seattle, WA (US); David Z Chen, Seattle, WA (US); Shiladitya Roy, Bellevue, WA (US); Sol Jee Cho, San Francisco, CA (US); Veer Yuganter Singh, Seattle, WA (US); Prashant Jayaram Thakare, Sammamish, WA (US); Alekya Jonnala, Bothell, WA (US); Rohit Bhattacharjee, Vancouver (CA); Nicholas Adam Cummings, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 558 days.

(21) Appl. No.: 17/381,731

(22) Filed: Jul. 21, 2021

(51) Int. Cl.
*G10L 15/22* (2006.01)
*G10L 15/18* (2013.01)
*G10L 15/28* (2013.01)
*G10L 15/08* (2006.01)

(52) U.S. Cl.
CPC .......... *G10L 15/22* (2013.01); *G10L 15/1815* (2013.01); *G10L 15/28* (2013.01); *G10L 2015/088* (2013.01); *G10L 2015/223* (2013.01); *G10L 2015/227* (2013.01); *G10L 2015/228* (2013.01)

(58) Field of Classification Search
USPC ....... 704/246, 247, 251, 252, 257, 275, 241, 704/242
See application file for complete search history.

(56) References Cited

U.S. PATENT DOCUMENTS

| | | |
|---|---|---|
| 10,170,116 B1 | 1/2019 | Kelly et al. |
| 10,205,988 B1 * | 2/2019 | Waterman .......... H04N 21/8455 |
| 11,227,592 B1 * | 1/2022 | Kockerbeck ........ G10L 15/1815 |

(Continued)

OTHER PUBLICATIONS

"Save data in conversation," retrieved from https://developers.google.com/assistant/conversational/df-asdk/save-data, 2021, 5 pages.

*Primary Examiner* — Leonard Saint-Cyr
(74) *Attorney, Agent, or Firm* — Pierce Atwood LLP

(57) ABSTRACT

Techniques for resuming a skill session are described. A system receives a user input, determines a skill to execute with respect to the user input, opens a skill session, and causes the skill to execute. After the skill executes, the skill indicates the skill session is to be placed in a background state, resulting in the user being able to conduct one or more skill sessions while the skill processes in the background state. Sometime after placing the skill session in the background state, the skill requests the system to resume the skill session. If the system determines the skill session is to be resumed, the system sends data to the skill indicating that the skill session will be resumed. Once the skill session is to be resumed, the system places the skill session in an active state, and calls the skill to resume processing of the skill session.

20 Claims, 13 Drawing Sheets

(56) References Cited

U.S. PATENT DOCUMENTS

| | | | |
|---|---|---|---|
| 2016/0098697 A1* | 4/2016 | Dunsmore | G06F 11/3636 |
| | | | 705/39 |
| 2016/0357861 A1* | 12/2016 | Carlhian | G06F 3/04842 |
| 2018/0143967 A1* | 5/2018 | Anbazhagan | G06F 8/30 |
| 2018/0336897 A1* | 11/2018 | Aggarwal | G06F 9/485 |
| 2018/0366114 A1* | 12/2018 | Anbazhagan | G06F 9/451 |
| 2018/0367483 A1* | 12/2018 | Rodriguez | H04L 67/10 |
| 2019/0020493 A1* | 1/2019 | Arling | G10L 15/22 |
| 2019/0042564 A1* | 2/2019 | Badr | G10L 15/26 |
| 2019/0074010 A1* | 3/2019 | Horling | G06F 16/9535 |
| 2019/0103101 A1* | 4/2019 | Danila | G10L 15/30 |
| 2021/0065701 A1* | 3/2021 | van Scheltinga | G06F 3/167 |
| 2022/0094650 A1* | 3/2022 | Lu | H04L 51/02 |
| 2023/0010815 A1* | 1/2023 | Tsuchida | H04W 76/11 |

* cited by examiner

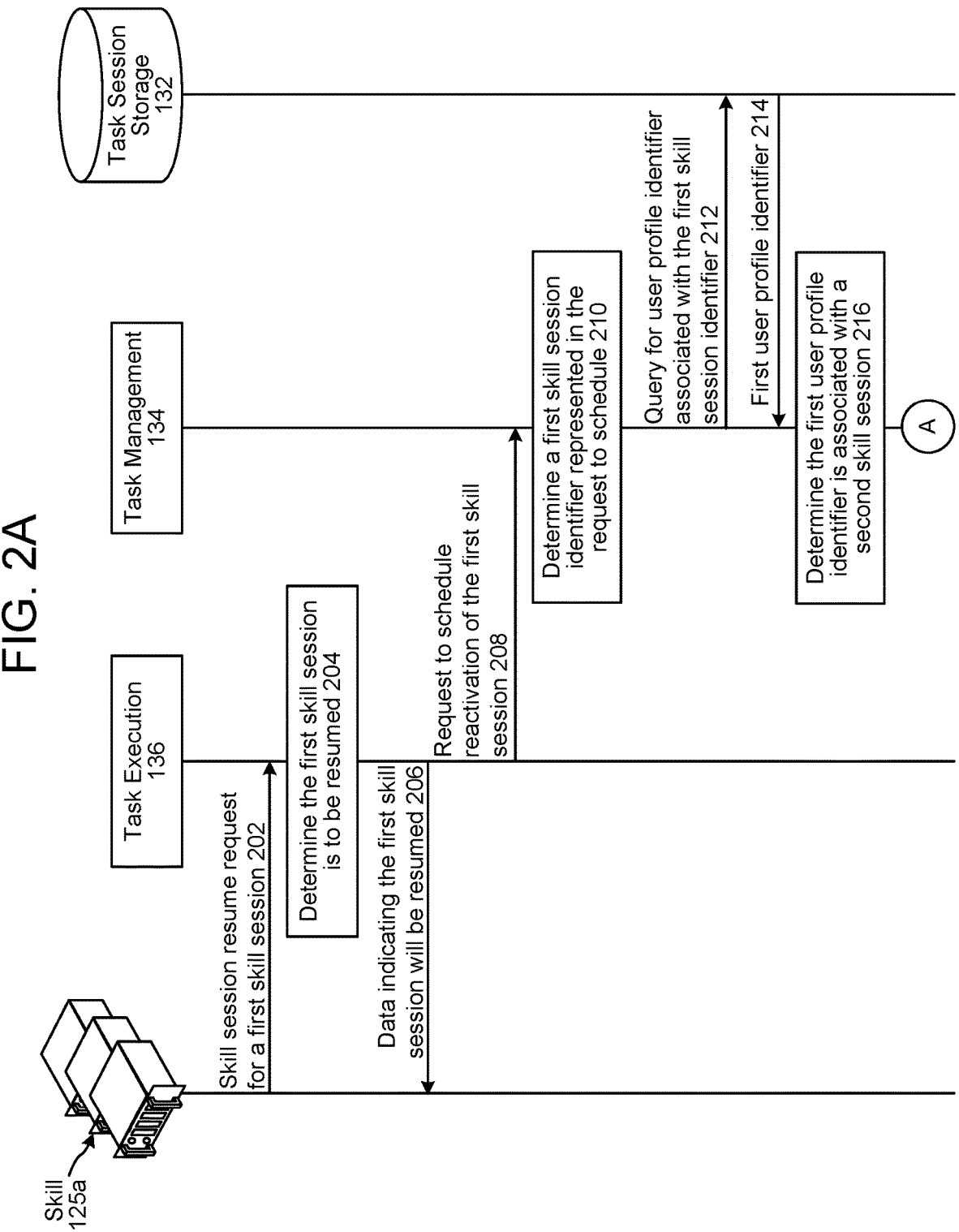

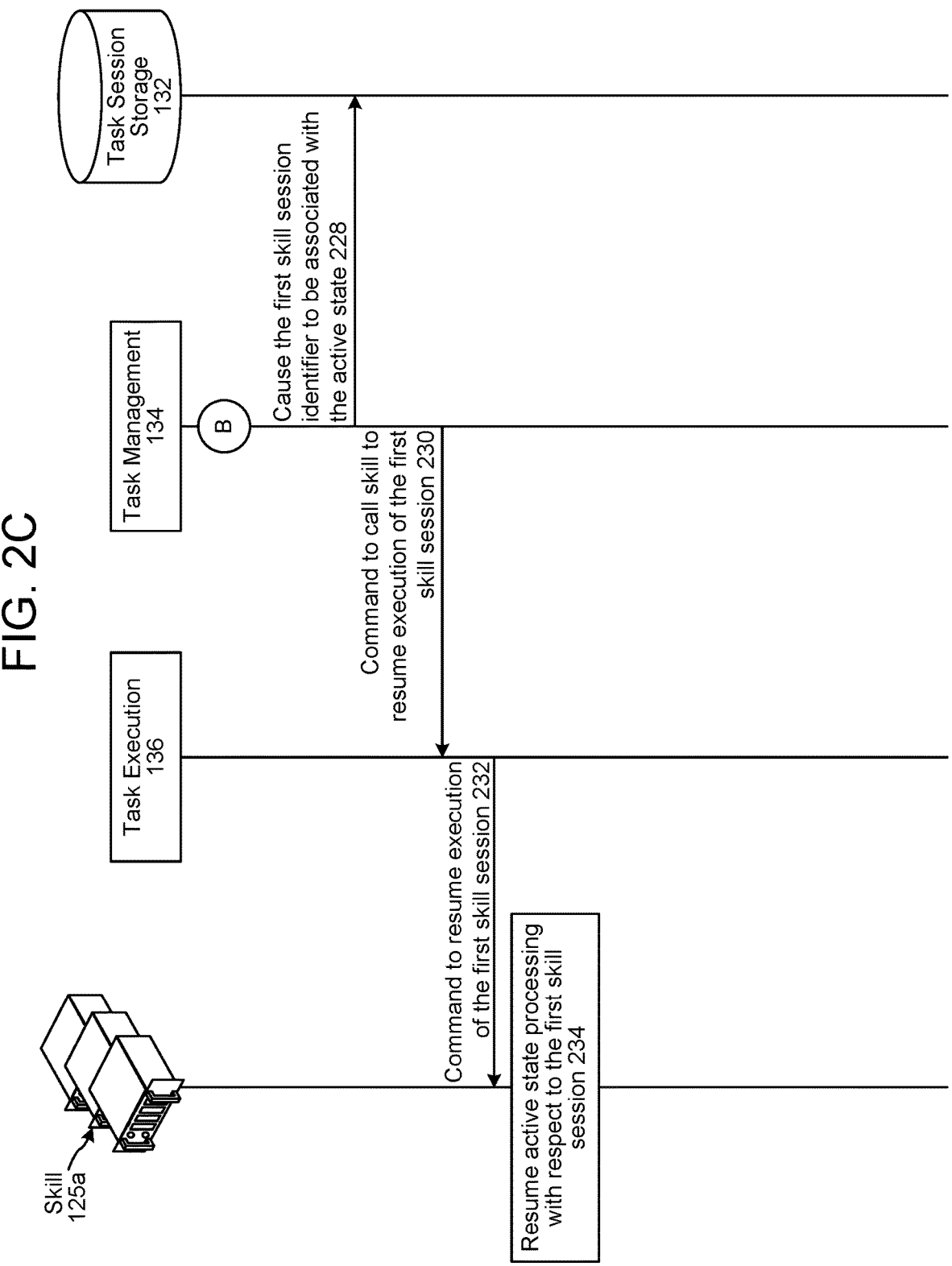

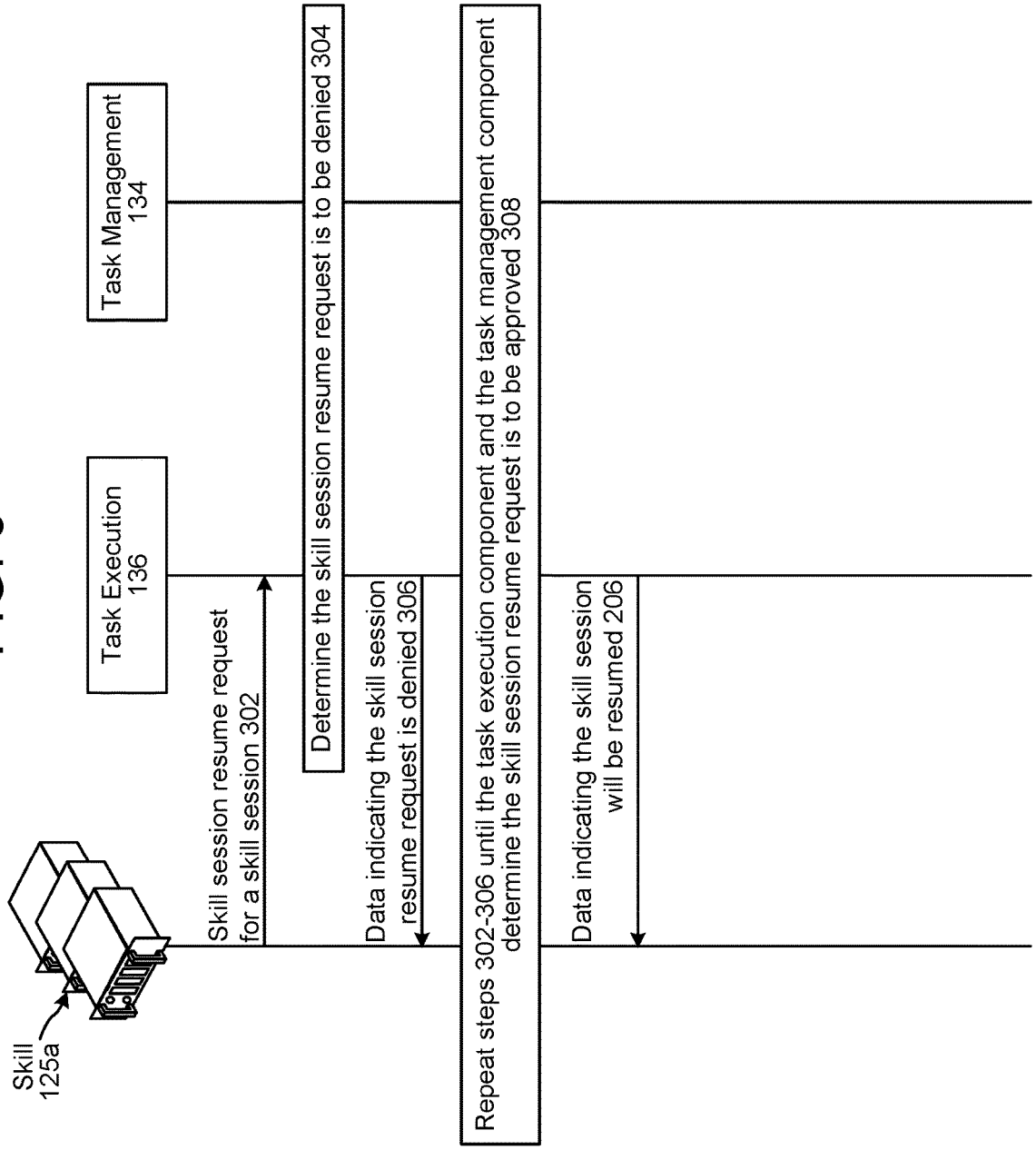

SKILL SESSION BACKGROUNDING AND RESUMPTION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 2A-2C are a signal flow diagram illustrating how resumption of a skill session may be delayed, according to embodiments of the present disclosure.

FIG. 3 is a signal flow diagram illustrating that a skill may send one or more additional skill session resume requests in response to a skill session resume request being denied, until a skill session resume request is approved, according to embodiments of the present disclosure.

DETAILED DESCRIPTION

Figure 1:
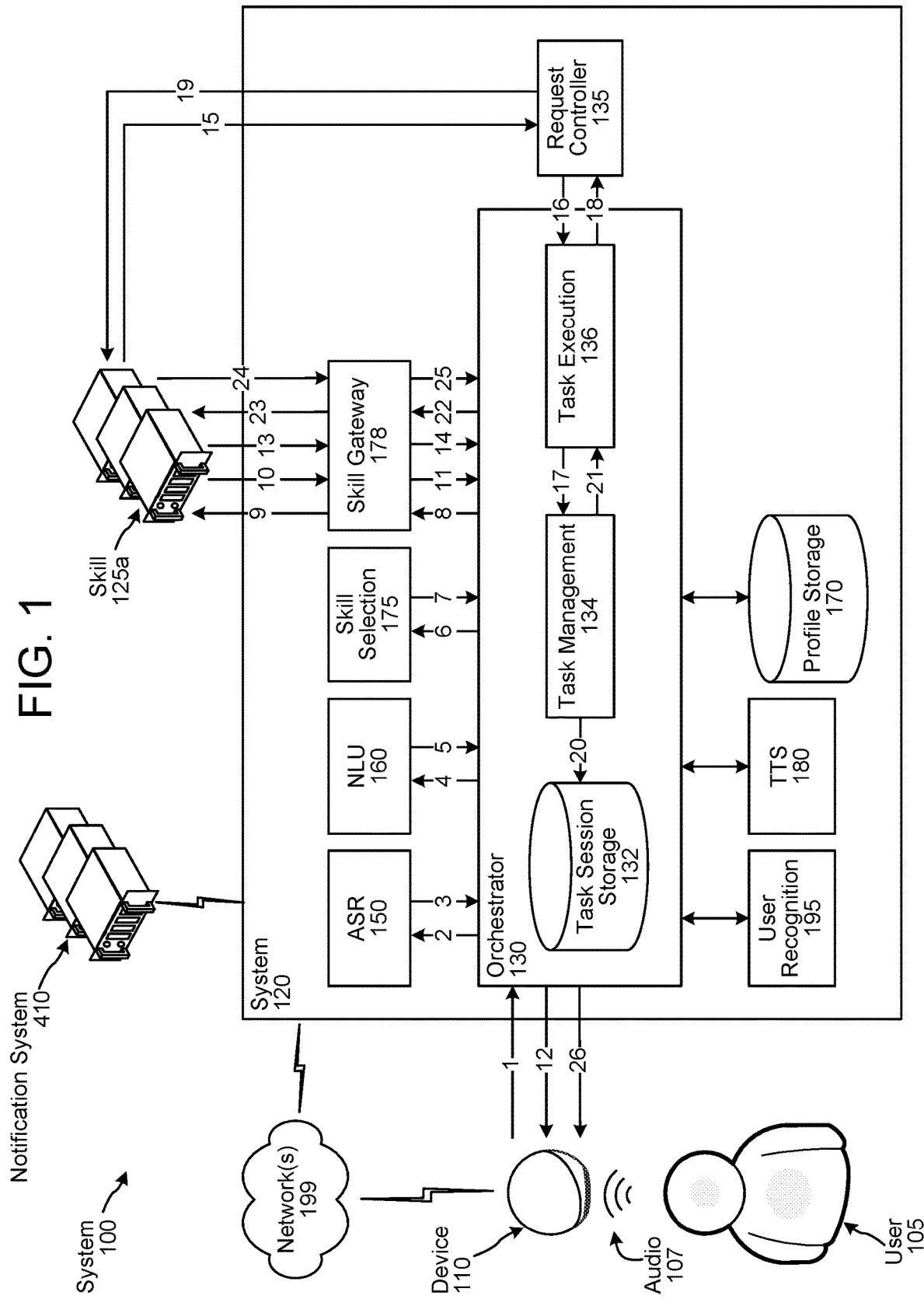
FIG. 1 is a conceptual diagram illustrating a system configured to enable skill processing in a background state, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may implement one or more skills to respond to user inputs (e.g., spoken user inputs). For example, for the user input "play music by [artist]," a music skill may output music sung by the indicated artist. For further example, for the user input "turn on the lights," a smart home skill may turn on "smart" lights associated with a user's profile. In another example, for the user input "what is the weather," a weather skill may output weather information for a geographic location corresponding to the device that captured the user input. For further example, for the user input "book me a ride to [location]," a taxi skill may book a taxi ride to the indicated location.

A "skill" refers to software, that may be placed on a machine or a virtual machine (e.g., software that may be launched in a virtual instance when called), configured to process at least NLU output data (including an intent and optionally one or more entities), and perform one or more actions in response thereto. A skill may operate in conjunction with various systems and devices, such as user devices, restaurant electronic ordering systems, taxi electronic booking systems, etc. in order to perform certain functions. What is referred to herein as a skill may sometimes be referred to as an application, bot, or the like.

When a skill is called to execute in response to a user input, a skill session may be established. As used herein, a "skill session" refers to an exchange of related user inputs and skill-generated responses. A skill session may be goal-oriented, meaning the skill session is directed to the performance of a specific action(s) (e.g., figuring out what music to play, booking a taxi, booking a flight, etc.). A user input and corresponding skill-generated response may be referred to as a "turn" of the skill session. A skill session identifier may be associated with each turn of the skill session. In addition, each turn may be associated with a respective turn identifier. One user input may be considered related to a subsequent user input, thereby causing a single skill session identifier to be associated with both user inputs. A first user input may be considered related to (and thus considered part of the same skill session as) a second (subsequent) user input based on, for example, a length of time between receipt of the first and second user inputs, a length of time between output of a skill-generated response to the first user input and receipt of the second user input, the substances of the first and second user inputs, and/or the substances of the second user input and the skill-generated response to the first user input. For example, a first user input indicating a pick-up location for a taxi and a subsequent user input indicating a drop-off location may be considered related (and thus part of the same skill session) since both user inputs relate to the goal of booking a taxi. For further example, a first user input indicating a departure airport and a second user input indicating an arrival airport may be considered related (and thus part of the same skill session) since both user inputs relate to booking a flight.

In some systems, a skill may be configured to process in a request-reply manner. That is, a skill may process to generate output data in response to receiving a user input. In such systems, a skill session may be associated with, for example, an active state or a terminated state. A skill session may be in the active state from when the skill session is established and until the skill session ends, at which point the skill session is associated with the terminated state. In such systems, a single skill may process at any given time to output information to a particular user. That is, in such systems, one skill session may be active at a time for a particular user. In some cases, a skill may need more time to process data and perform a requested action. In such cases, a user may have to wait for the requested action to be performed, and since some example configurations allow one skill session to be active at a time, the user may not be able to engage with another skill and request other actions to be performed while waiting.

Teachings of the present disclosure relate to, among other things, a system configured to enable a skill to process in a background state, and proactively output (without receiving a user input requesting) content to a user based on the background processing. As such, a skill, according to the present disclosure, may indicate that a presently active skill session is to be placed in a background state. Thereafter, the skill may continue to perform processing, related to the skill session, while the user may interact with one or more other skills of the system.

At some point, the skill (processing in the background state) may determine content should be output to the user as part of the previously active, now backgrounded skill session. Upon such determination, the skill may request the system to resume the backgrounded skill session. If the system determines the backgrounded skill session can be resumed, the skill may thereafter output the content to the user without the user providing a user input specifically requesting the content.

The following provides an example of how the foregoing system processing may be experienced by a user. A user may provide a spoken user input to the system to book a taxi, where the spoken user input indicates at least a pick-up location where the taxi is to pick up the user. In response, the taxi skill may cause the system to output synthesized speech representing the taxi skill is finding a taxi to fulfill the user's request. Upon causing the system to output the foregoing synthesized speech, the taxi skill may indicate to the system that the skill session (relating to the booking of the taxi) is to be placed in a background state. In response, the system may associate the skill session with the background state, thereby enabling the user to engage in one or more other skill sessions with one or more other skills of the system while the taxi skill locates the taxi to fulfill the user's request. While the skill session is in the background state, the taxi skill may determine a taxi and, in response, request the system to resume the backgrounded skill session. The system may thereafter transition the skill session from the background state to the active state, enabling the taxi skill to provide the user with information (e.g., in the form of synthesized speech) about the taxi (e.g., make, model, license plate, estimated time of arrival, etc.) without the user providing a user input requesting the information.

The taxi skill may be configured to be notified when a taxi arrives at a pickup location. Thus, rather than the taxi skill causing the system to terminate the skill session after outputting the information about the reserved taxi, the taxi skill may again indicate to the system that the skill session is to be placed in the background state. In response, the system may again associate the skill session with the background state, thereby enabling the user to engage in one or more other skill sessions with one or more other skills of the system. While the skill session is in the background state, the taxi skill may receive (or determine) an event indicating the taxi has arrived at the pick-up location previously indicated by the user. In response to the event, the taxi skill may request the system to resume the backgrounded skill session. The system may thereafter transition the skill session from the background state to the active state, enabling the taxi skill to indicate to the user (e.g., as synthesized speech) that the taxi has arrived at the pick-up location. It will be appreciated that the foregoing example is not limiting, and that the present disclosure envisions various scenarios in which a skill may perform processing in a background state. It will be appreciated from the foregoing that the present disclosure provides an improved user experience in which a skill may output information, relating to an ongoing (backgrounded) skill session, without the user having to specifically request the information.

The present disclosure also provides techniques for preventing a skill from interrupting an active skill session by giving the system control in determining when to resume the backgrounded skill session. Moreover, the present disclosure provides techniques for preventing a skill from using a skill session resume request to proactively output information to a user when the skill is not associated with a presently backgrounded skill session. Such also results in an improved user experience.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to enable skill processing in a background state. Although the figures and discussion of the present disclosure illustrate certain steps in a particular order, the steps described may be performed in a different order (as well as certain steps removed or added) without departing from the present disclosure.

As shown in FIG. 1, the system 100 may include a device 110 (local to a user 105) in communication with a system 120 across a network(s) 199. The network 199 may include the Internet and/or any other wide- or local-area network, and may include wired, wireless, and/or cellular network hardware.

The system 120 may be a speech processing system configured to process spoken user inputs using ASR and NLU processing. The system 120 may include multiple components to facilitate speech processing, such as, an orchestrator component 130, an ASR component 150, a NLU component 160, a skill selection component 175, and one or more skills 125. While FIG. 1 shows a skill 125a being implemented separate from and in communication with the system 120, in some embodiments the skill 125a may be implemented by the system 120. The system 120 may also include a profile storage 170, a TTS component 180, and a user recognition component 195 to facilitate processing of users inputs and generating outputs.

The user 105 may speak an input, and the device 110 may capture audio 107 representing the spoken input. In other examples, the user 105 may provide another type of input (e.g., selection of a button, selection of one or more displayed graphical interface elements, performance of a gesture, etc.). The device 110 may send (step 1) input audio data (or other type of input data, such as, image data, text data, etc.) corresponding to the user input to the system 120 for processing. The orchestrator component 130 may receive the input data from the device 110. In the case that the input data is audio data, the orchestrator component 130 may send (step 2) the audio data to the ASR component 150, and the ASR component 150 may process the audio data to determine ASR output data including one or more ASR hypotheses (e.g., token data, natural language text data, etc.) corresponding to the words spoken by the user 105. Details on how the ASR component 150 may process the audio data are described below. The ASR component may send (step 3) the ASR output data to the orchestrator component 130.

The orchestrator component 130 may send (step 4) the ASR output data to the NLU component 160, and the NLU component 160 may process the ASR output data to determine an intent corresponding to the user input. The NLU component 160 may also determine a domain corresponding to the user input. The NLU component 160 may also perform named entity recognition (NER) processing to identify portions of the user input that relate to entities (e.g., persons, places, and things) and corresponding entity types. The NLU component 160 may generate NLU output data including more than one NLU hypothesis, where each NLU hypothesis includes an intent, a domain, one or more entities (to the extent such are mentioned in the user input), and a confidence score of NLU processing to generate the NLU hypothesis. The NLU component 160 may send (step 5) the NLU output data to the orchestrator component 130, which may send (step 6) the NLU output data to the skill selection component 175.

The skill selection component 175 is configured to determine a single skill that is to execute to respond to the user input. Details on how the skill selection component 175 may process are described below. The skill selection component 175 may send (step 7), to the orchestrator component 130, a skill identifier of a skill 125a that is to process the instant user input.

In response to receiving the skill identifier from the skill selection component 175, the orchestrator component 130 may determine a new skill session identifier to be used to associate processing of related user inputs by the skill 125a. The orchestrator component 130 may store, in a task session storage 132, data associating the skill session identifier, the skill identifier of the skill 125a, an active state indicator representing the skill 125a is presently executing to respond to a user input, and other context data corresponding to the skill session (e.g., a device type of the device 110, a user profile identifier of the user 105, a locale (e.g., geographic region, such as a country) in which the device 110 is located, etc.).

The orchestrator component 130 may send (step 8), to a skill gateway component 178 of the system 120, the NLU output data (generated by the NLU component 160 for the instant user input) and the skill session identifier. In the situation where the NLU component 160 generates more than one NLU hypothesis, the orchestrator component 130 may send, to the skill gateway component 178, the NLU hypothesis corresponding to the skill 125a.

In some embodiments, the orchestrator component 130 (and potentially other components of the system 120) may not be configured to know all the data types needed by a skill to process NLU output data to generate output data responsive to a user input. The skill gateway component 178 may be a component of the system configured to know the types of data a skill needs to execute, and constructs a request to a skill that includes all the data needed by the skill. For example, in addition to the NLU output data and the skill session identifier, the skill 125a may need one or more context data (e.g., device type information, user type information, location information, etc.) to properly process the NLU output data. The skill gateway component 178 may determine the one or more data types needed by the skill 125a to process the NLU output data, may obtain the one or more data types, and may generate a request to the skill, where the request includes the NLU output data, the skill session identifier, and the obtained one or more data types. The skill gateway component 178 sends (step 9) the request to the skill 125a.

The skill 125a may process to determine output data responsive to the user input (e.g., based on an intent and the entity(ies) of the user input, as represented in the NLU output data, and the one or more types of context data received by the skill 125a). For example, if the user input requests the playing of a song, the output data may be an audio file (or link to an audio file) corresponding to the song. For further example, if the user input requests weather information, the output data may be structured or natural language data corresponding to the requested weather information.

The skill 125a sends (step 10) the output data to the skill gateway component 178, which may send (step 11) the output data to orchestrator component 130. The orchestrator component 130 causes (step 12) an output, corresponding to the output data, to be presented to the user 105 via the device 110. Causing the output to be presented may include the orchestrator component 130 calling a TTS component 180 (discussed in detail below) to process the output data to generate output audio data including synthesized speech.

In addition to sending the output data to the skill gateway component 178 at step 10, the skill 125a may also send (step 13), to the skill gateway component 178 (and, in some embodiments, a task management component 134 of the orchestrator component 130), data including the skill session identifier and representing the skill session is to be placed in a background state. In some embodiments, steps 10 and 13 may occur at substantially the same time. As used herein, placing a skill session in a background state means the skill 125a may continue to process with respect to the skill session without preventing the user 105 from being able to engage in one or more other skill sessions with one or more other skills (i.e., without preventing another skill from processing using the user profile identifier of the user 105 while the skill session is in the background state). That is, the user 105 may provide one or more users inputs to the system 120, and the one or more user inputs may be processed by one or more skills while the skill 125a processes with respect to the ongoing, backgrounded skill session. For example, subsequent user inputs from the user 105 may be processed in a similar manner as described in relation to steps 1-7, and another skill 125b may be selected by the skill selection component 175 to process with respect to the subsequent user inputs.

The skill gateway component 178 may send (step 14), to the orchestrator component 130 (and in some embodiments, a task management component 134 of the orchestrator component 130), the data including the skill session identifier and representing the skill session is to be placed in a background state. In response to receiving the data at step 14, the orchestrator component 130 (or the task management component 134) may update the data in the task session storage 132 to cause the skill session identifier to be associated with a background state indicator therein, and no longer be associated with the active state indicator.

After sending the data at step 13, the skill 125*a* may continue to process with respect to the backgrounded skill session. For example, if the skill 125*a* sends output data (at step 10) indicating a taxi is being determined in response to a user input requesting a taxi, after the skill session is backgrounded the skill 125*a* may continue to process to determine the taxi for the user 105. For further example, if the skill 125*a* sends output data (at step 10) indicating a flight is being determined in response to a user input requesting a flight, after the skill session is backgrounded the skill 125*a* may continue to process to determine a flight meeting the user's criteria. As another example, if the skill 125*a* sends output data (at step 10) indicating a pizza is being ordered in response to a user input requesting ordering of the pizza, after the skill session is backgrounded the skill 125*a* may continue to process place the pizza order with an electronic pizza ordering system. It will be appreciated that the foregoing examples are merely illustrative, and that other examples are possible.

Sometime after sending the data at step 13 causing the skill session to be associated with a background state, the skill 125*a* may determine further output data is to be presented to the user 105 for the backgrounded skill session. For example, if the skill 125*a* sends output data (at step 10) indicating a taxi is being determined in response to a user input requesting a taxi, while the skill session is backgrounded the skill 125*a* may determine the taxi and determine information of the taxi (e.g., make, model, license plate, color, etc.) is to be output to the user 105. For further example, if the skill 125*a* sends output data (at step 10) indicating a flight is being determined in response to a user input requesting a flight, while the skill session is backgrounded the skill 125*a* may determine a flight satisfying the user's criteria, and determine the flight information is to be output to the user 105. As another example, if the skill 125*a* sends output data (at step 10) indicating a pizza is being ordered in response to a user input requesting ordering of the pizza, while the skill session is backgrounded the skill 125*a* place the pizza order with an electronic pizza ordering system, and determine delivery or pick-up information for the pizza order is to be output to the user 105. It will be appreciated that the foregoing examples are merely illustrative, and that other examples are possible.

In response to determining further output data is to be presented to the user 105 for the backgrounded skill session, the skill 125*a* may send (step 15), to a request controller 135 of the system 120, a request to resume the backgrounded skill session. The request may include the skill identifier, of the skill 125*a*, and the skill session identifier (or token(s) corresponding to same) of the backgrounded skill session. In some embodiments, the request may be made via a skill session resume request application programming interface (API) configured specifically for such requests. When the skill 125*a* calls the skill session resume request API, the skill 125*a* is not informing the request controller 135 as to what the further output by the skill 125*a* will be. Rather, the skill session resume request API call simply indicates to the request controller 135 that the skill 125*a* needs to be called again (e.g., by the system 120 via the orchestrator 130) to execute with respect to the backgrounded skill session.

In response to receiving the request at step 15, the request controller 135 may generate and send (step 16), to a task execution component 136 of the orchestrator component 130, data representing the request received at step 15. For example, the request controller 135 may generate and send data including the skill session identifier (or token(s) corresponding thereto), data indicating that resumption of the skill session is being requested, and data indicating the skill session resume request was initiated by a skill. In some embodiments, the request controller 135 may send (step 16) the data to the task execution component 136 via a task API.

While the above describes the skill 125*a* requesting resumption of the background skill session via the request controller 135, the present disclosure is not limited thereto. Rather, the skill 125*a* may communicate directly with the task execution component 136 to request resumption of the backgrounded skill session. In such instances, the task execution component 136 may implement the aforementioned skill session resume request API.

The task execution component 136 is configured to determine whether the skill session resume request is to be approved or denied. In some embodiments, the task execution component 136 may implement one or more rules for determining whether to approve or deny the skill session resume request.

In some embodiments, the task execution component 136 may implement a rule that if the to-be-resumed skill session is associated with a user profile identifier that is presently associated with another skill session associated with the active state, then the skill session resume request is to be denied. Such a rule may prevent a skill from interrupting an ongoing skill session with the user 105.

In some embodiments, the system 100 may be configured such that the user 105 may engage in an active skill session with a skill while the skill also has a background skill session for the user 105. The foregoing rule may prevent the skill from interrupting its ongoing skill session with the user 105.

In some embodiments, the task execution component 136 may implement a rule that if the user 105 has provided a user input requesting the backgrounded skill session be suspended (resulting in the background skill session being associated with a suspended state), then the skill session resume request is to be denied.

In some embodiments, the task execution component 136 may implement a rule that if the skill session resume request is improper, then the skill session resume request is denied. A skill session resume request may be improper if it is missing information (e.g., a skill session identifier, a skill identifier, etc.), if it includes incorrect information (e.g., a skill session identifier that is not stored/known to the system 120), if it includes invalid information (e.g., a skill session identifier that is already in a terminated state), etc.

In some embodiments, the system 120 may be configured to transition a skill session from being associated with the background state to being associated with a terminated state if the skill session has been associated with the background state for at least a threshold amount of time. In such embodiments, the task execution component 136 may implement a rule that if the skill session resume request includes a skill session identifier associated with the terminated state, then the skill session resume request is to be denied.

The system 120 may be configured such that a skill's skill session resume requests may be not approved for a user unless the user has already provided permission indicating a skill can resume skill sessions with the user. Such permissions may be stored in a user profile of the user (e.g., in the profile storage 170). As such, in some embodiments the task execution component 136 may implement a rule that if the user profile identifier, associated with the to-be-resumed skill session, is not associated with a permission indicating the skill (requesting the resumption) can resume skill sessions, then the skill session resume request is to be denied.

Some devices may be configured with a do not disturb mode. A device may be placed in a do not disturb mode in various ways (e.g., by a user activating a specifically configured button of the device, by the user speaking a user input indicating do not disturb mode is to be active, etc.). When a device is placed in the do not disturb mode, the system 120 may store data representing same. For example, the system 120 may associate the device identifier (of the device) with a do not disturb indicator (e.g., a data tag). Association of the do not disturb indicator with the device identifier may prevent the device from receiving user inputs and sending input data (corresponding to same) to the system 120 for processing, may cause the system 120 to cease processing of a user input that was received prior to the do not disturb mode being activated but for which a system response has not been output, may prevent the system 120 from waking the device to output content to the user, may prevent a notification system from using the device to indicate that the user has notifications for output, etc. In some embodiments, the task execution component 136 may implement a rule that if a device identifier, associated with the to-be-resumed skill session, is associated with a do not disturb indicator, then the skill session resume request is to be denied.

The skill 125*a* may intentionally or unintentionally include, in the skill session resume request, a skill session identifier not associated with the background state. In some embodiments, the task execution component 136 may implement a rule that if the skill resume request includes a skill session identifier not associated with the background state, then the skill session resume request is to be denied.

In some embodiments, the system 120 may be configured such that the skill 125*a* may send up to a maximum number of skill session resume requests within a period of time (e.g., a day, a week, etc.). In such embodiments, the task execution component 136 may implement a rule that if the skill 125*a* has already sent the maximum number of skill session resume requests with the period of time, then the skill session resume request is to be denied.

It will be appreciated that the foregoing rules, that may be implemented by the task execution component 136, are merely illustrative, and that the task execution component 136 may implement additional or other rules without departing from the present disclosure.

In the example of FIG. 1, the task execution component 136 may determine that the skill session resume request is to be approved (i.e., that the backgrounded skill session is to be resumed). In response to such a determination, the task execution component 136 may send (step 17), to a task management component 134 of the orchestrator component 130, a request to schedule transitioning of the skill session from the background state to the active state.

In addition to sending the request to the task management component 134 at step 17, the task execution component 136 may send (step 18), to the request controller 135, data including the skill session identifier, the skill identifier of the skill 125*a*, and data representing the skill session resume request has been approved. In embodiments where the request controller 135 sends the data to the task execution component 136 via a task API at step 16, the task execution component 136 may send the data at step 18 to the request controller 135 via the task API.

The request controller 135 may, in turn, send (step 19), to the skill 125*a*, data including the skill session identifier and representing the skill session resume request has been approved (i.e., that the skill session will be resumed). However, the data, sent at step 19, may not instruct the skill 125*a* to resume processing of the skill session. In embodiments where the skill 125*a* sends the data to the request controller 136 via a skill session resume request API at step 15, the request controller 135 may send the data at step 19 to the skill 125*a* via the skill session resume request API.

The task management component 134 may be configured to coordinate the changing of skill session states. Sometime after receiving the request (at step 17) from the task execution component 136 to activate the backgrounded skill session, the task management component 134 may active the backgrounded skill session. Such activation may include the task management component 134 updating (step 20) the task session storage 132 to cause the skill session identifier (of the backgrounded skill session) to be associated with the active state, and no longer associated with the background state, resulting in the backgrounded skill session becoming active again.

In addition to updating the task session storage 132, the task management component 134 may determine various context data associated with the skill session identifier in the task session storage 132 (and/or from another source, such as the profile storage 170). The context data may include various different information, including a locale (e.g., state, country, continent, etc.) of the device 110/user 105, an access token representing the user 105 to the skill 125*a*, a device identifier of the device 110 that was used to previously perform the skill session, an identifier of a voice profile that was used by the TTS component 180 to generate synthesized speech in a particular voice for the skill session prior to backgrounding of the skill session, and/or other information relating to the skill session and that may be usable by the skill 125*a* to perform further processing for the skill session.

The task management component 134 may send (step 21), to the task execution component 136, a command to call the skill 125*a* to execute with respect to the reactivated skill session. The command may include the skill identifier of the skill 125*a*, the skill session identifier that was reactivated, and the context data determined by the task management component 134. In response to receiving the command, the task execution component 136 may send (step 22), to the skill gateway component 178, a command to resume processing with respect to the skill session. The command may include the skill session identifier of the reactivated skill session and the context data. In some embodiments, the task execution component 136 may send the command to the skill gateway component 178 via a skill session resume API.

In some embodiments, in addition to sending the command to the skill gateway component 178 at step 22, the task execution component 136 may determine a device identifier (of the device 110 that previously received at least one user input of the backgrounded skill session) represented in the context data received from the task management component 134 at step 21, and may cause the orchestrator component 130 to send, to the device 110, a command to wake (i.e., transition from a low-power state to a high-power state). In the low-power state, the device 110 may be configured to detect speech, and detect whether the speech includes a wakeword (as discussed detail herein below). In the high-power state, the device 110 may be configured to present content (e.g., output synthesized speech and/or display a graphical user interface).

In response to receiving the command at step 22, the skill gateway component 178 may determine all date needed by the skill 125*a* to execute the command, and send (step 23), to the skill 125*a*, the command and any other data determined by the skill gateway component 178.

In response to receiving the data at step 23, the skill 125*a* may process to determine output data based on the processing performed while the skill session was associated with the background state, and which caused the skill 125*a* to send the skill session resume request to the request controller 135 at step 15. The skill 125*a* sends (step 24) the output data to the skill gateway component 178, which may send (step 25) the output data to the orchestrator component 130. The orchestrator component 130 causes (step 26) an output, corresponding to the output data, to be presented to the user 105 via the device 110. Causing the output to be presented may include the orchestrator component 130 calling a TTS component 180 (discussed in detail below) to process the output data to generate output audio data including synthesized speech.

After the orchestrator component 130 causes the device 110 to present the output at step 26, the skill 125*a* may process with respect to one or more additional user inputs relating to the skill session. Alternatively, after the orchestrator component 130 causes the device 110 to present the output at step 26, the skill 125*a* may send, to the orchestrator component 130 (and more particular the task management component 134), data representing the skill session is to again be associated with the background state. Alternatively, after the orchestrator component 130 causes the device 110 to present the output at step 26, the skill 125*a* may send, to the orchestrator component 130 (and more particular the task management component 134), data representing the skill session is to be terminated. Thus, it will be appreciated that the processing, described above with respect to FIG. 1 may be performed one or more times, with respect to a single skill session, but the skill 125*a* indicates the skill session is to be terminated, at which point the task management component 134 may associate the skill session identifier (of the skill session) with a terminated state in the task session storage 132. Once the skill session identifier is associated with the terminated state, the skill session can no longer be backgrounded and resumed, as the skill session is ended.

Figure 2B:
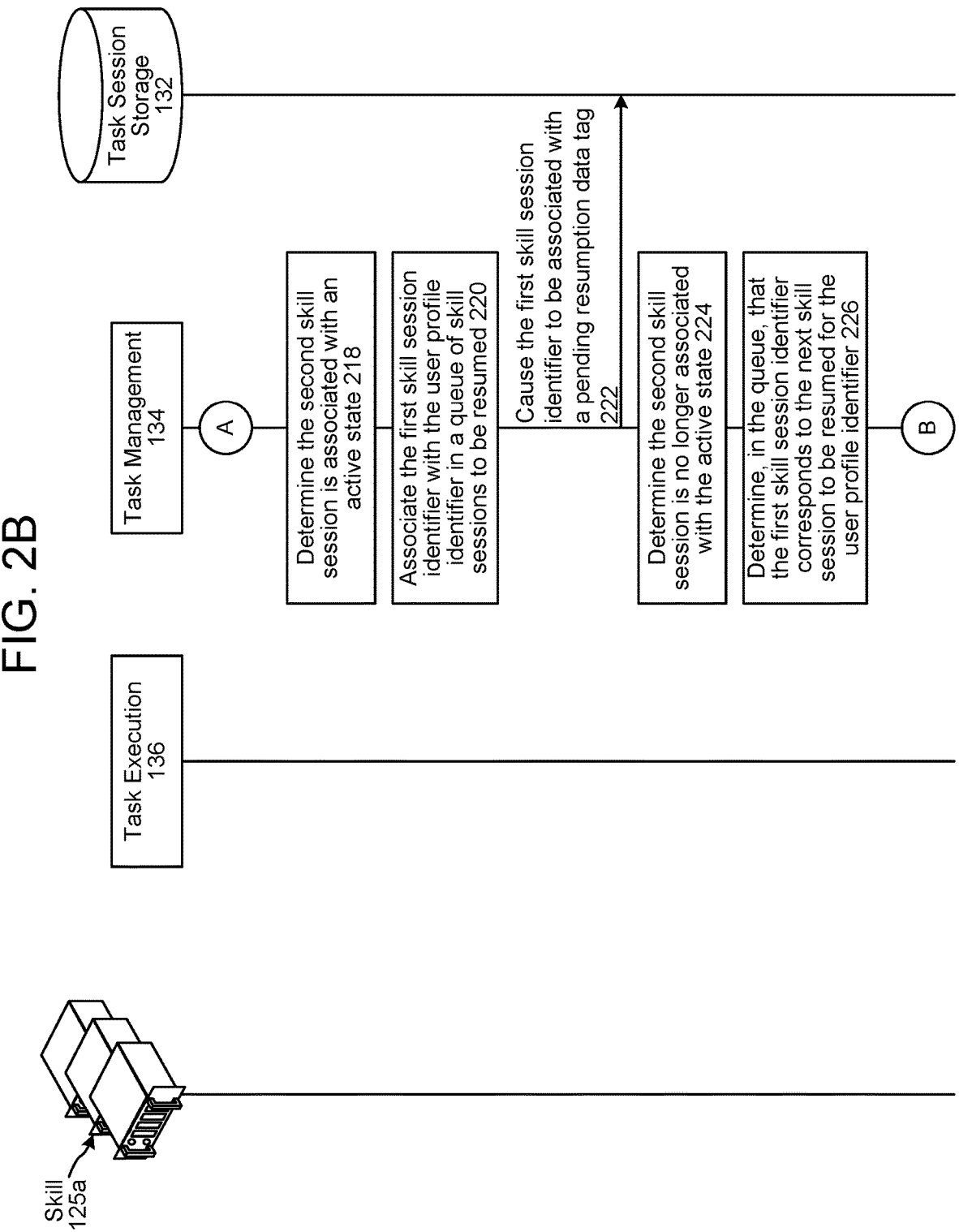

In some embodiments, the task execution component 136 may determine a skill session is to be resumed even though another skill session is presently active. In some embodiments, the task management component 134 may be configured to add the skill session to a queue, and delay resumption of the backgrounded skill session. FIGS. 2A-2C illustrate how such processing may be performed.

As illustrated in FIG. 2A, the skill 125*a* may send (step 202, steps 12 and 13 in FIG. 1), to the task execution component 136, a skill session resume request for a first skill session. The task execution component 136 may process, as described with respect to FIG. 1, to determine (step 204) that the first skill session is to be resumed. In response, the task execution component 136 may send (step 206, steps 15 and 16 in FIG. 1), to the skill 125*a*, data indicating the first skill session will be resumed. The task execution component 136 may also send (step 208, step 17 in FIG. 1), to the task management component 134, a request to schedule reactivation of the first skill session.

In response to receiving the request, the task management component 134 may determine (step 210) a first skill session identifier (corresponding to the first skill session) represented in the request to schedule. The task management component 134 may query (step 212) the task session storage 132 for a user profile identifier associated with the first skill session identifier therein. In other words, the task management component 134 may query the task session storage 132 for a user profile identifier corresponding to the user 105 that previously engaged the skill 125*a* in the first skill session before the first skill session was backgrounded. In response, the task management component 134 may receive (step 214) a first user profile identifier (corresponding to the user 105) associated with the first skill session identifier in the task session storage 132.

The task management component 134 may determine (step 216) the first user profile identifier is associated with a second skill session, and may determine (step 218 in FIG. 2B) the second skill session is associated with an active state. For example, the task management component 134 may query the task session storage 132 as to whether the first user profile identifier is associated with an active skill session, and the query may return results indicating "yes" and/or including the active skill session identifier.

In response to determining the first user profile identifier is associated with a presently active skill session, the task management component 134 may associate (step 220) the first skill session identifier (of the to-be-resumed first skill session) with the user profile identifier in a queue of skill sessions to be resumed. Moreover, in response to determining the first user profile identifier is associated with a presently active skill session, the task management component 134 may cause (step 222) the first skill session identifier (of the to-be-resumed first skill session) to be associated with a pending resumption data tag (in addition to the background state) in the task session storage 132). As used herein, a "pending resumption" data tag indicates a skill session that is backgrounded and is presently queued to be re-activated.

Sometime after storing the first skill session identifier in the queue and causing the first skill session identifier to be associated with the pending resumption data tag, the task management component 134 may determine (step 224) the second skill session is no longer associated with the active state. For example, the task management component 134 may receive, from a skill corresponding to the second skill session, data indicating the second skill session is to be terminated (e.g., is to end and no longer be usable to perform processing of user inputs), or data indicating that the second skill session is to be backgrounded. In response, the task management component 134 may associate the second skill session (and more particular an identifier thereof) with a terminated state or the background state, respectively, in the task session storage 132, resulting in the task management component 134 determining the second skill session is no longer associated with the active state.

In response to determining the second skill session is no longer associated with the active status, the task management component 134 can determine whether the user profile identifier (associated with the second skill session) is associated with any skill session identifiers in the queue of skill sessions to be resumed. In the example of FIG. 2B, the task management component 134 may determine (step 226), in the queue, that the first skill session identifier (of the first skill session) corresponds to the next skill session to be resumed for the user profile identifier.

In response to determining the first skill session identifier corresponds to the next skill session to be resumed for the user profile identifier, the task management component 134 may cause (step 228 in FIG. 2C) the first skill session identifier to be associated with the active state (and no longer be associated with the background state or the pending resumption data tag) in the task session storage 132. Moreover, in response to determining the first skill session identifier corresponds to the next skill session to be resumed for the user profile identifier, the task management component 134 may send (step 230, step 21 in FIG. 1), to the task execution component 136, a command to call the skill 125a to resume execution of the first skill session.

In response to receiving the command at step 230, the task execution component 136 may send (step 232, steps 22 and 23 in FIG. 1), to the skill 125a, a command to resume execution of the first skill session. In response, the skill 125a may resume (step 234) active state processing with respect to the first skill session, as described herein above with respect to FIG. 1.

FIG. 3 illustrates that a skill may send one or more additional skill session resume requests in response to skill session resume request being denied, until a skill session resume request is approved. As illustrated in FIG. 3, the task execution component 136 may receive (step 302), from the skill 125a, a skill session resume request for a first skill session.

The task execution component 136 and the task management component 134 may determine (step 304) that the skill session resume request is to be denied. The following are non-limiting examples of when the task execution component 136 and the task management component 134 may determine the skill session resume request is to be denied.

For example, the task execution component 136 and the task management component 134 may determine the skill session resume request is to be denied based on the user 105 presently being engaged in another skill session. For example, the task execution component 136 may determine a skill session identifier in the skill session resume request, and send a request to the task management component 134 to determine whether a user profile identifier, associated with the skill session identifier, is associated with a presently active skill session. The task management component 134 may then determine a user profile identifier associated with the skill session identifier in the task session storage 132, determine the user profile identifier is associated with a second skill session, determine the second skill session is associated with an active state, and based thereon determine the skill session resume request is to be denied.

For further example, the task execution component 136 and the task management component 134 may determine the skill session resume request is to be denied based on a number of skill session resume requests that have been received from the skill 125a in a period of time (e.g., a past day, week, month, etc.). For example, in response to receiving the skill session resume request, the task execution component 136 may determine a number of skill session resume request that have been received from the skill 125a during a period of time. The task execution component 136 may determine whether the number of skill session resume requests satisfies (e.g., meets or exceeds) a condition (e.g., a threshold number of skill session resume requests). If the task execution component 136 determines the number of skill session resume requests fails to satisfy (e.g., fails to meet or exceed) the condition (e.g., the threshold number of skill session resume requests), the task execution component 136 may determine the skill session resume request may be approved. Conversely, if the task execution component 136 determines the number of skill session resume requests satisfies (e.g., meets or exceeds) the condition (e.g., the threshold number of skill session resume requests), the task execution component 136 may determine the skill session resume request is to be denied.

In another example, the task execution component 136 and the task management component 134 may determine the skill session resume request is to be denied based on the task execution component 136 determining the skill session resume request includes an improper syntax (e.g., a header of the skill session resume request is invalid or not present, the request object in the payload is invalid, etc.).

For further example, the task execution component 136 and the task management component 134 may determine the skill session resume request is to be denied based on the device 110 (that received at least one user input when the skill session was previously active) being in a do not disturb mode. For example, the task execution component 136 may determine a skill session identifier in the skill session resume request, and send a request to the task management component 134 to determine a device identifier associated with the skill session identifier in the task session storage 132. The task management component 134 may determine the device identifier associated with the skill session identifier in the task session storage 132, and send the device identifier to the task execution component 136. The system 120 may store a storage of device identifiers associated with device states. The task execution component 136 may determine the device identifier is associated with a do not disturb indicator in the storage. Based thereon, the task execution component 136 may determine the skill session resume request is to be denied.

In another example, the task execution component 136 and the task management component 134 may determine the skill session resume request is to be denied based on the skill 125a not having permission to resume skill sessions with the user 105. For example, the task execution component 136 may determine a skill session identifier in the skill session resume request, and send a request to the task management component 134 to determine a user profile identifier associated with the skill session identifier in the task session storage 132. The task management component 134 may determine the user profile identifier associated with the skill session identifier in the task session storage 132, and send the user profile identifier to the task execution component 136. The task execution component 136 may then determine user profile data corresponding to the user profile identifier in the profile storage 170, and determine the user profile data fails to indicate the user 105 has provided a user input representing permission for the skill 125a to resume skill sessions associated with the user profile identifier. Based thereon, the task execution component 136 may determine the skill session request is to be denied.

For further example, the task execution component 136 and the task management component 134 may determine the skill session resume request is to be denied based on a state of the skill session. For example, the task execution component 136 may determine a skill session identifier in the skill session resume request, and send a request to the task management component 134 to determine a state associated with the skill session identifier in the task session storage 132. The task management component 134 may determine the state associated with the skill session identifier in the task session storage 132, and send the state to the task execution component 136. The task execution component 136 may then determine the skill session resume request is to be denied based on the state. For example, the task execution component 136 may determine the skill session resume request is to be denied if the state is a terminated state, suspended state, active state, or another state other than the background state.

When the task execution component 136 and the task management component 134 determine the skill session resume request is to be denied, the task execution component 136 and the task management component 134 may not terminate the skill session (i.e., associate the skill session identifier with a terminated state). Rather, the task execution component 136 and the task management component 134 may leave the skill session in the background state.

When the task execution component 136 and the task management component 134 determine the skill session resume request is to be denied, the task execution component 136 send (step 306), to the skill 125a, data indicating the skill session resume request is denied, and that the first skill session is going to remain in the background state. In some embodiments, the data may further indicate the reason why the request was denied (e.g., improper syntax, the skill session is currently in a suspended state, etc.)

In response to the skill 125a receiving the data at step 306, the skill 125a may submit another skill session resume request, and steps 302-306 may be repeated (step 308) until the task execution component 136 and the task management component 134 determine the most recently received skill session resume request is to be approved. Once it is determined that the skill session resume request is to be approved, the task execution component 136 may send (step 206; similar to the step 206 of FIG. 2A), to the skill 125a, data indicating the skill session will be resumed. Following this, task execution component 136 and the task management component 134 may process as described above with respect to FIGS. 1-2C until the skill 125a is sent the command to resume the skill session.

Figure 4:
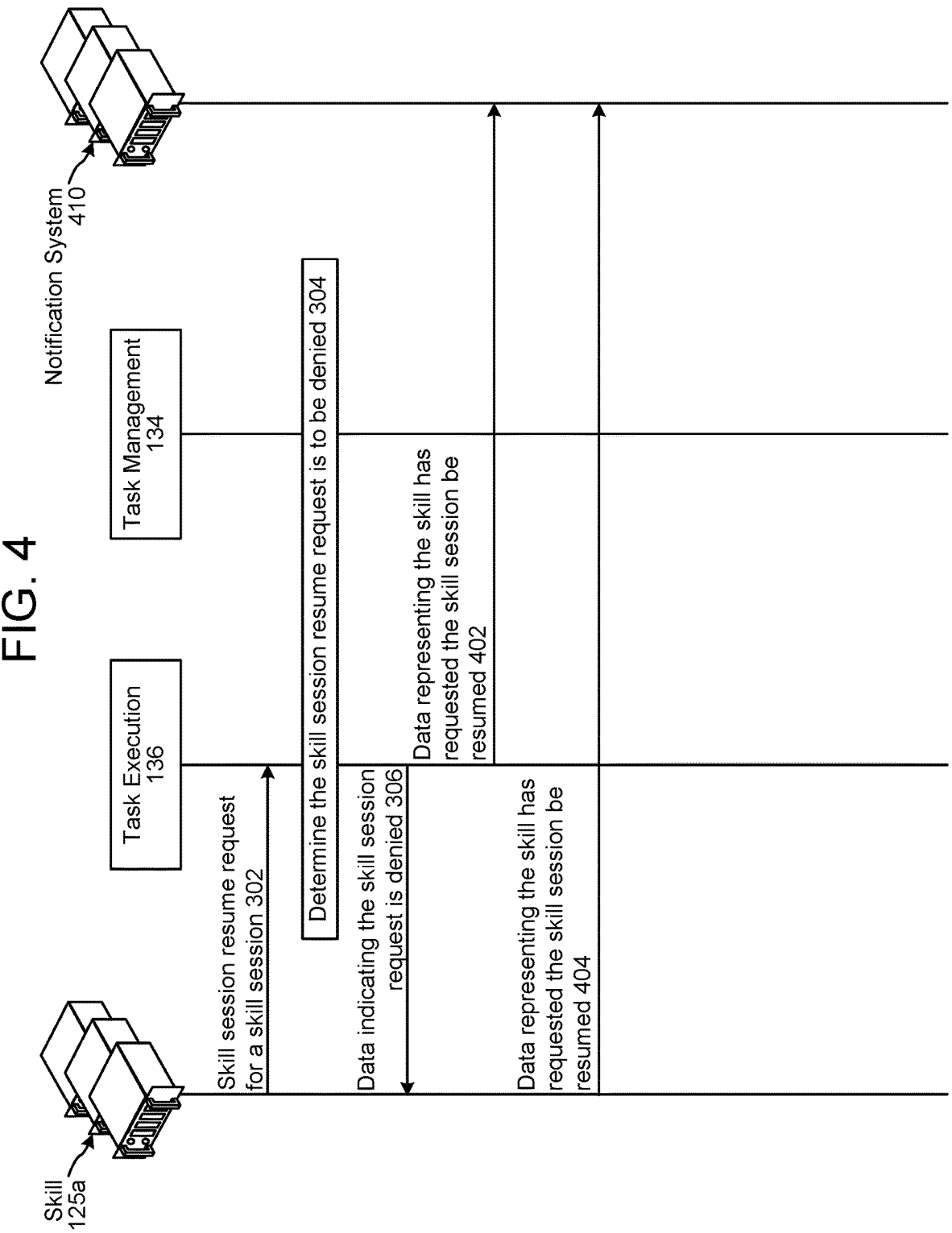
FIG. 4 is a signal flow diagram illustrating that a skill and/or a task execution component may cause a notification to be output to a user in response to a skill session resume request being denied, according to embodiments of the present disclosure.

In addition to or instead of the skill 125a submitting one or more additional skill session resume requests until one is approved, as illustrated in FIG. 3, the skill 125a and/or the task execution component 136 may cause a notification to be output to the user 105, where the notification indicates the skill 125a has requested the skill session be resumed. As illustrated in FIG. 4, the skill 125a may send (step 302), to the task execution component 136, the skill session resume request for a skill session. The task execution component 136 and the task management component 134 may then determine (step 304) the skill session resume request is to be denied, and the task execution component 136 may send (step 306), to the skill 125a, data indicating the skill session request is denied.

In addition to sending the data at step 306 and based on determining the skill session resume request is to be denied, the task execution component 136 may send (step 402), to a notification system 410, data representing the skill 125a has requested the skill session be resumed. In response to receiving the data at step 306, and in addition to or instead of the task execution component 136 sending the data at step 402, the skill 125a may send (step 404), to the notification system 410, data representing the skill 125a has requested the skill session be resumed. In the situation where the task execution component 136 sends the data at step 402, the data may include the user profile identifier and a name of the skill 125a, and optionally a topic of the skill session (e.g., booking of a ride, booking of a flight, etc.). In the situation where the skill 125a sends the data to the notification system 410, the data may include the user profile identifier and the name of the skill 125a, and optionally a topic of the background processing that the skill 125a wants to output to the user 105 (e.g., the taxi has arrived to pick up the user 105, a flight satisfying the user's criteria has been identifier, etc.).

In some embodiments, whether or not the task execution component 136 sends the data to the notification system 410 may depend on a time sensitiveness of the background processing of the skill 125a. For example, the skill session resume request may represent a time sensitiveness (e.g., urgent or not urgent), and the task execution component 136 may determine whether to send the data to the notification system 410 based on the time sensitiveness represented in the skill session resume request. For example, the task execution component 136 may not send the data to the notification system 410 when the skill session resume request indicates the background processing is not urgent (e.g., when a flight booking skill finds a flight satisfying the user's search criteria), but may send the data to the notification system 410 when the skill session resume request indicates the background processing is urgent (e.g., when a taxi skill wants to indicate that a reserved taxi has arrived at a pickup location).

Figure 5:
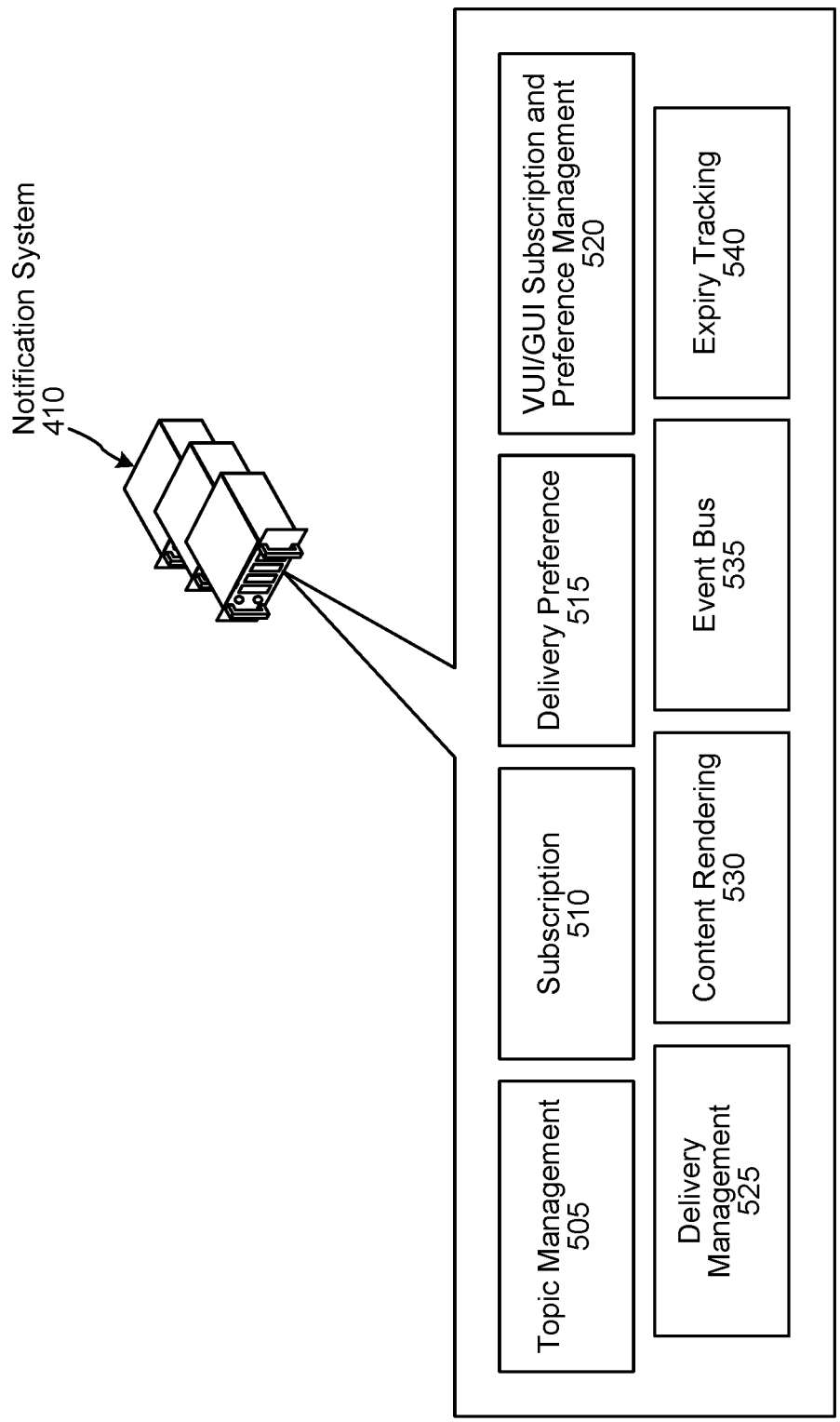
FIG. 5 is a conceptual diagram of components of a notification system, according to embodiments of the present disclosure.
Figure 6:
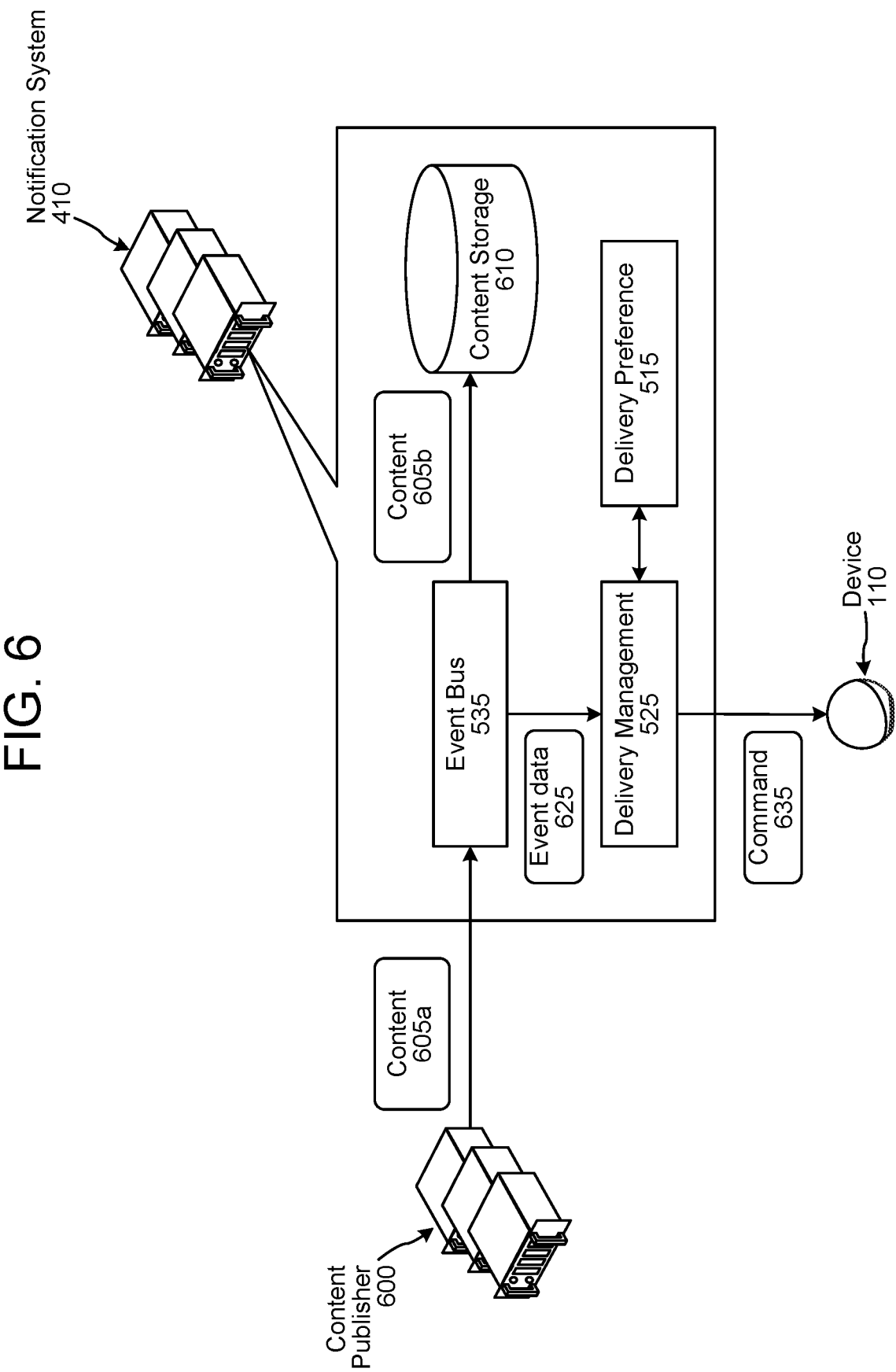
FIG. 6 is a conceptual diagram of components for indicating content using the notification system, according to embodiments of the present disclosure.
Figure 7:
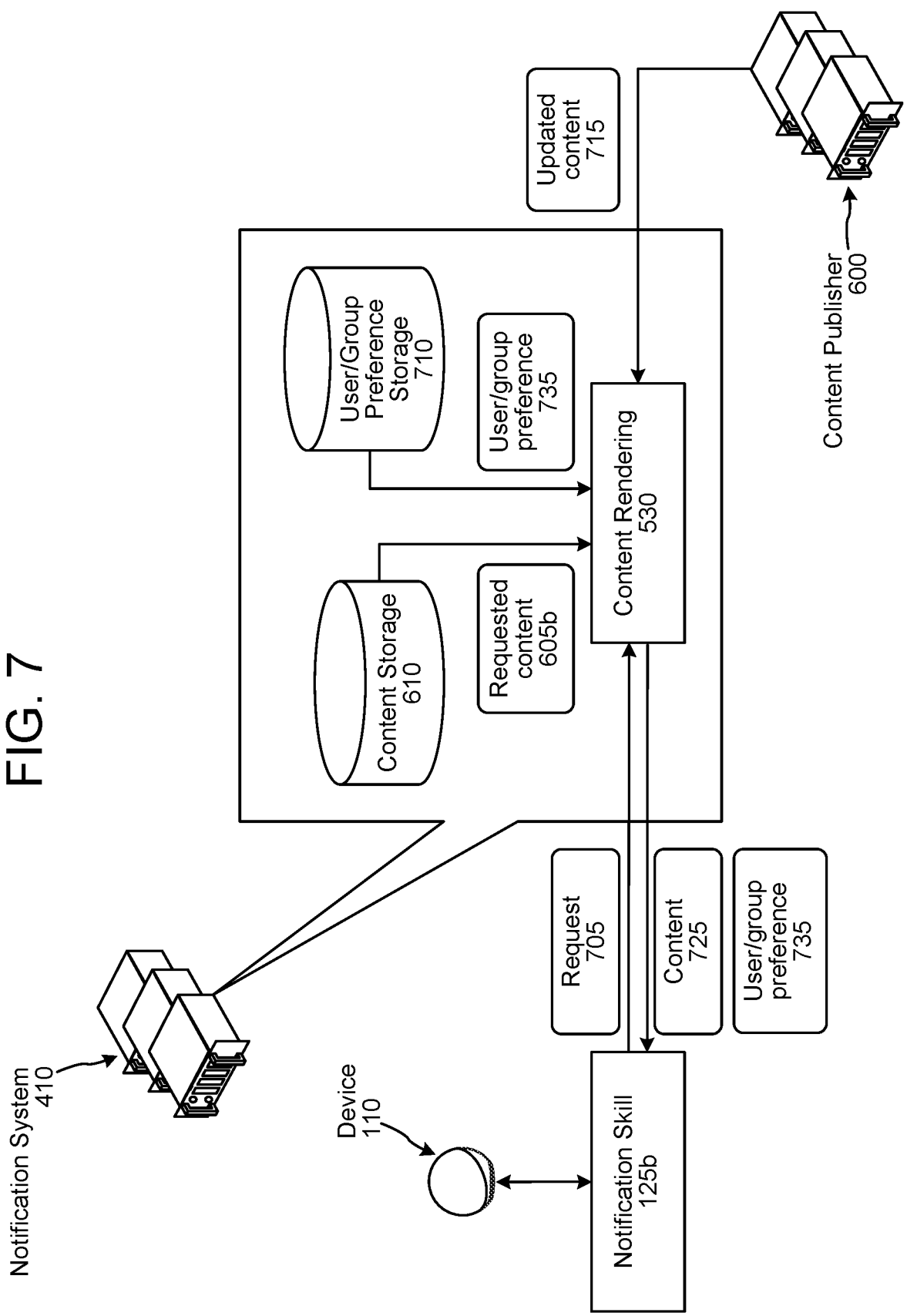
FIG. 7 is a conceptual diagram of components for outputting content using the notification system, according to embodiments of the present disclosure.

FIGS. 5-7 illustrate example components and processing of the notification system 410. As illustrated in FIG. 5, the notification system 410 may include a topic management component 505, a subscription component 510, a delivery preference component 515, a VUI/GUI subscription and preference management component 520, a delivery management component 525, a content rendering component 530, an event bus 535, an expiry tracking component 540, and/or other components.

The topic management component 505 may include a repository of content topics supported by the notification system 410. Example content topics include, but are not limited to, meeting start time, new email, sporting event update, weather update, taxi arrival, product delivery, and media (e.g., television) start time.

The topic management component 505 may also include a repository of schemas for content topics. A schema may define the structure data is to take for a particular content topic. For example, a schema may indicate data, corresponding to a particular content topic, is to include the content to be output and one or more particular types of metadata (e.g., an identifier of the publisher of the content, a topic of the content, how the content publisher prefers the content be indicated to a user(s), how the content publisher prefers the content be output to a user(s), a validity duration of the content, etc.). In some embodiments, each schema may be associated with one content topic, and each content topic may be associated with one schema. In other embodiments, a schema may be associated with more than one content topic and/or a content topic may be associated with more than one schema.

The topic management component 505 may include one or more APIs. The topic management component 505 may include one or more APIs for content publishers to get a schema. For example, the topic management component 505 may be configured such that each schema is associated with a respective, different API. The topic management component 505 may also include one or more APIs that enable the topic management component 505 to fetch the one or more topics supported by a content publisher.

The subscription component 510 may manage all content subscriptions. The subscription component 510 may communicate with a subscription storage (not illustrated) containing all content subscriptions. The subscription component 510 may implement one or more APIs that enable users to subscribe to receive particular content topics. In some embodiments, the one or more APIs may include one or more Create, Read, Update, and Delete (CRUD) APIs.

When a user/group of users subscribes to receive a content topic, the subscription component 510 may associate, in the subscription storage, a user/group identifier, of the user/group of users, with a content topic indicator corresponding to the content topic. In some situations, the user/group of users may subscribe to receive a content topic from one or more particular content publishers. In such situations, the subscription component 510 may associate, in the subscription storage, the user/group identifier with the content topic indicator and each identifier of each of the one or more content publishers. The data, in the subscription storage, enables user/group identifier-based retrieval of content subscriptions.

The delivery preference component 515 may manage all content delivery preferences. The delivery preference component 515 may communicate with a content delivery preference storage (not illustrated) containing all content delivery preferences. The delivery preference component 515 may implement one or more APIs that enable users to indicate preferences for receiving content (e.g., activation of a light indicator, display of a banner, a time when content can be or should not be output, etc.). In some embodiments, the one or more APIs may include one or more CRUD APIs.

In some instances, a user/group of users may indicate a delivery preference(s) with respect to a particular content topic. In such instances, the delivery preference component 515 may associate, in the content delivery preference storage, a user/group identifier, of the user/group of users, with a content topic indicator, corresponding to the content topic, and data representing the delivery preference(s). In some situations, the user/group of users may indicate a delivery preference(s) with respect to a content topic and one or more particular content publishers. In such situations, the delivery preference component 515 may associate, in the content delivery preference storage, the user/group identifier with the content topic indicator, each identifier of each of the one or more content publishers, and data representing the delivery preference(s). The data, in the content delivery preference storage, enables user/group identifier-based retrieval of content delivery preferences.

The VUI/GUI subscription and preference management component 520 may be configured to authenticate incoming user requests that originate from a companion application. A companion application is one that may be installed on a handheld device 110 (e.g., a smart phone or tablet) and that enables the handheld device 110 to communicate with the system 120 and the notification system 410. An example of a companion application is the Amazon Alexa application that may be installed on handheld devices.

The VUI/GUI subscription and preference management component 520 may include one or more APIs. In some embodiments, the one or more APIs may include one or more external proxy representation state transfer (REST) APIs that enable authentication of user requests. In some embodiments, the one or more APIs may include a backend proxy API.

The delivery management component 525 manages the runtime delivery of content (i.e., determines how content should be indicated to a user). The delivery management component 525 may include one or more APIs to manage runtime delivery of content. In some embodiments, the one or more APIs may include one or more CRUD APIs. For example, when the notification system 410 receives content for a user, the delivery management component 525 may be called to determine how the content should be indicated to the user. Such determination may be based on various considerations.

In some embodiments, the delivery management component 525 may determine content should be indicated if the corresponding content publisher has registered with the notification system 410 to provide content to users. In some embodiments, the delivery management component 525 may determine content should be indicated if the corresponding content publisher has registered with the notification system 410 to provide content of the particular content topic of the content. In some embodiments, the delivery management component 525 may determine content should be indicated if one or more devices of the intended recipient are not in a "do not disturb" mode (i.e., device identifiers of the one or more devices are not associated with do not disturb indicators/flags).

The delivery management component 525 may also determine preferences for how content should be indicated to the intended recipient. For example, the delivery management component 525 may determine a preference(s) of the content publisher and/or the intended recipient. In some embodiments, the preference(s) of the content publisher may be determined from the metadata associated with the received content. In some embodiments, the preference(s) of the intended recipient may be determined from a subscription(s) of the intended recipient. A preference(s) may indicate an output type for indicating the content (e.g., activation of a light indicator, display of a GUI element, vibration of a device, etc.) and/or when (e.g., time of day, day of week, etc.) the content may be indicated.

The delivery management component 525 may determine an output type(s) for indicating content. The delivery management component 525 may determine the output type(s) based on a preference(s) of a content publisher, a preference(s) of the intended recipient, and/or characteristics/components of one or more devices 110 of the intended recipient.

The content rendering component 530 is configured to generate read-time content. The content rendering component 530 may generate read-time content using one or more templates, using a serial peripheral interface (SPI) callback, or determining pre-configured content. When generating the read-time content, the content rendering component 530 may validate that the generated content includes valid speech synthesis markup language (SSML).

The event bus 535 may allow content publishers to publish events to the notification system 410. The event bus 535 may also allow systems to subscribe to receive events published to the event bus 535 by components of the notification system 410.

The expiry tracking component 540 is configured to determine when content is expiring, and causing the content to be indicated and/or proactively output to an intended user.

Referring now to FIG. 6, it is described how the notification system 410 may receive content and indicate same. A content publisher 600 (e.g., the skill 125*a* or the task execution component 136) may send content 605*a* (e.g., data representing the skill 125*a* has requested the skill session be resumed) to the event bus 535 of the notification system 410. In some embodiments, the content 605*a* may be in a structured, tagged, non-natural language format. In other words, the content 605*a* may not be in a format suitable for output to the intended user 105 and/or group of users. For example, the content 605*a* may include "NotificationTopic: Skill Session Resumption; Skill: [Skill Name]," representing the skill has request resumption of the skill session.

In some embodiments, the content 605*a* may be in natural language. For example, the content 605*a* may be "[skill name] has requested your session be resumed."

The content 605*a* may be accompanied by (i.e., associated with) metadata. In some embodiments, the metadata may include a single user identifier corresponding to the single user 105 to receive the content 605*a*. In some embodiments, the metadata may include a group identifier corresponding to a group of users to receive the content 605*a*.

In some embodiments, the metadata may include a user identifier(s) and/or group identifier(s) stored in the profile storage 170. In at least some embodiments, the metadata may include an encoded user identifier corresponding to a user identifier stored in the profile storage 170. In some embodiments, the metadata may include an encoded group identifier corresponding to a group identifier stored in the profile storage 170. In some embodiments, to maintain user privacy, the content publisher 600 (e.g., the skill 125*a*) may not have access to a user identifier and/or group identifier stored in the profile storage 170. In these embodiments, the metadata may include an identifier that uniquely corresponds to a particular user identifier and/or group identifier stored in the profile storage 170.

In some embodiments, the metadata may indicate a validity duration of the content 605*a*. In other words, the metadata may indicate an amount of time (e.g., minutes, hours, days, etc.) that the content 605*a* is valid for. In other embodiments, the content publisher 600 may indicate a validity duration of a content topic when the content publisher 600 registers with the notification system 410 to provide content to users thereof. In such embodiments, the metadata may include a content topic (e.g., skill session resumption, etc.), and the notification system 410 may determine the content topic in the metadata, determine the content 605*a* and metadata was received from the content publisher 600, and, based on the foregoing, determine a validity duration of the content 605*a*.

In some embodiments, the metadata may indicate an output type the content publisher 600 recommends be used to output the content 605*a*. For example, the metadata may indicate the content 605*a* should be output as synthesized speech. For further example, the metadata may indicate the content 605*a* should be output using a display. As another example, the metadata may indicate the content 605*a* should be output both as synthesized speech and using a display. In a further example, the metadata may indicate the content 605*a* may be output either as synthesized speech or using a display.

In some embodiments, the metadata may include a content publisher identifier corresponding to the content publisher 600.

In some embodiments, the content publisher 600 may send the content 605*a* and associated metadata to the event bus 535 via an API.

The event bus 535 may communicate with a content storage 610. The content storage 610 may be implemented by the notification system 410. When the metadata, associated with the content 605*a*, includes a user identifier, the content storage 610 may store an association between content 605*b* (corresponding to the content 605*a*), the user identifier, and the metadata. When the metadata, associated with the content 605*a*, includes a group identifier, the content storage 610 may store an association between the content 605*b*, the group identifier, and the metadata. Additionally or alternatively, when the metadata, associated with the content 605*a*, includes a group identifier, the notification system 410 may determine one or more user identifiers associated with the group identifier, and the content storage 610 may store an association between the content 605*b*, the metadata, and each of the one or more user identifier associated with the group identifier.

In some situations, the content storage 610 may store more than one content associated with a single user or group identifier at a point in time. In some embodiments, the notification system 410 may be configured to determine a score (e.g., confidence score, probability score, etc.) representing content should in fact be output to a user. The content storage 610 may associate content with its respective score such that the contents associated with a single user or group identifier may effectively be ranked within the content storage 610 according to priority of output.

In some embodiments, the content 605*b* may be a copy of the content 605*a*. For example, the contents 605*a*/605*b* may both be a structured, non-natural language formatted content.

In some embodiments, the notification system 410 may receive the content 605*a* in a structured, non-natural language form, but the content storage 610 may store the content 605*b* in a natural language form. In some embodiments, the notification system 410 may use a template-based approach to generate the natural language formatted content 605*b*. A template may include natural language with portions (e.g., variables) to be populated with information from the structured, non-natural language content 605*a*. A template may be associated with a content publisher. A template may additionally or alternatively be associated with a content topic. In some embodiments, the notification system 410 may perform one or more art-known/industry-known natural language generation techniques using the structured, non-natural language content 605*a* to generate the corresponding natural language content 605*b*.

In some embodiments, the subscription component 510 (of the notification system 410) may confirm the intended user and/or group or users subscribed to receive the content 605*a* prior to storing the content 605*b* in the content storage 510. For example, the subscription component 510 may determine the user identifier and/or group identifier associated with the content 605*a*, and determine (in a subscription storage) whether the user and/or group identifier is associated with an identifier of the content publisher 600 (and optionally the content topic represented in the metadata associated with the content 605*a*). If the subscription component 510 determines the user and/or group of users has not subscribed to receive the content 605*a* (e.g., the subscription storage is not storing an association between the user and/or group identifier and an identifier of the content publisher 600, and optionally the content topic), the subscription component 510 may prevent the content 605*b* from being stored in the content storage 510. Conversely, if the subscription component 510 determines the user and/or group of users has subscribed to receive the content 605*a* (e.g., the subscription storage is storing an association between the user and/or group identifier and an identifier of the content publisher 600, and optionally the content topic), the subscription component 510 may store the content 605*b* in the content storage 510.

After receiving the content 605*a* from the content publisher 600 (and optionally after storing the content 605*b* in the content storage 510), the event bus 535 may publish event data 625 representing the content 605*a* has been received (or the content 605*b* has been stored). The delivery management component 525 subscribes to receiving such event data 625. Upon receiving the event data 625, the delivery management component 525 may determine whether the user and/or group of users should be notified that the content 605*b* is available for output.

The user and/or group of users (and more particularly the user and/or group profile data of the user and/or group of users) may be associated with one or more devices 110 configured to notify the user and/or group of users using one or more techniques. For example, the user and/or group of users may be associated with one or more devices 110 configured to notify the user, that the content 605*b* is available for output, by activating a light indicator (e.g., a light ring, light emitting diode (LED), etc.) in a particular manner (e.g., exhibit a particular color, blink in a particular manner, etc.); displaying a GUI element, such as a banner, card, or the like; vibrating in a particular manner (e.g., at a particular vibration strength, particular vibration pattern, etc.); and/or use some other mechanism. The delivery management component 525 may determine which device(s) 110 and which notification mechanism(s) should be used to notify the user and/or group of users of that the content 605b is available for output.

The delivery management component 525 may determine how to notify the user(s) of the content 605b based on device characteristics. The event data 625 may include the user and/or group identifier associated with the content 605b in the content storage 510. The delivery management component 525 may query the profile storage 170 for device characteristic data associated with one or more device identifiers associated with the user and/or group identifier. A given device's device characteristic data may represent, for example, whether the device 110 has a light(s) capable of indicating the content 605b is available for output, whether the device 110 includes or is otherwise in communication with a display capable of indicating the content 605b is available for output, and/or whether the device 110 includes a haptic component capable of indicating the content 605b is available for output.

The delivery management component 525 may indicate the content 605b is available for output based on the device characteristic data. For example, if the delivery management component 525 receives first device characteristic data representing a first device 110a includes a light(s), the delivery management component 525 may send, to the first device 110a, a first command 635a to activate the light(s) in a manner that indicates the content 605b is available for output. In some situations, two or more devices of the user and/or group of users may be capable of indicating the content 605b is available for output using lights of the two or more devices. In such situations, the delivery management component 525 may send, to each of the two or more devices, a command to cause the respective device's light(s) to indicate the content 605b is available for output.

The delivery management component 525 may additionally or alternatively receive second device characteristic data representing a second device 110b includes or is otherwise in communication with a display. In response to receiving the second device characteristic data, the delivery management component 525 may send, to the second device 110b, a second command 635b to display text, an image, a popup graphical element (e.g., a banner) that indicates the content 605b is available for output. For example, the displayed text may correspond to "you have an unread notification." But the text may not include specifics of the content 605b. An example of the second command 635b may be a mobile push command.

In some situations, two or more devices of the user and/or group of users may be capable of indicating the content 605b is available for output by displaying content. In such situations, the delivery management component 525 may send, to each of the two or more devices, a command to cause the respective device to display content indicating the content 605b is available for output.

The delivery management component 525 may additionally or alternatively receive third device characteristic data representing a third device 110c includes a haptic component. In response to receiving the device characteristic data, the delivery management component 525 may send, to the third device 110c, a third command 635c to vibrate in a manner that indicates the content 605b is available for output.

The delivery management component 525 may determine how to indicate the content 605b is available for output based on a user and/or group preference(s) corresponding to the user and/or group identifier associated with the content 605b in the content storage 520. For example, the delivery management component 525 may query the delivery preference component 515 for one or more indication preferences associated with the user and/or group identifier. An indication preference may indicate whether content is to be indicated using a light indicator, displayed content, vibration, and/or some other mechanism. An indication preference may indicate content, corresponding to a particular content topic, is to be indicated using a light indicator, displayed content, vibration, and/or some other mechanism.

The delivery management component 525 may additionally or alternatively determine how to indicate the content 605b is available for output based on a preference of the content publisher 600 that provided the content 605a. For example, during offline operations, the content publisher 600 may indicate content is to be indicated using a light indicator, displayed content, vibration, and/or some other mechanism. For further example, during offline operations, the content publisher 600 may indicate content, corresponding to a particular content topic, is to be indicated using a light indicator, displayed content, vibration, and/or some other mechanism. In another example, the content publisher 600 may indicate, at runtime, how the content 605a is to be indicated. For example, the content 605a may be associated with metadata representing how the content 605a is to be indicated to the user and/or group of users. The delivery management component 525 may query the delivery preference component 515 for one or more indication preferences associated with the identifier of the content publisher 600, and optionally the content topic associated with the content 605a.

In some situations, the delivery preference component 515 may determine and send, to the delivery management component 525, a user preference(s) and a content publisher preference(s) for indicating the content 605b is available for output. The delivery management component 525 may give priority to the user preference(s) in situations where the user preference(s) does not conform with the content publisher preference(s) (e.g., the user preference(s) indicates the content 605b is to be indicated using a light(s), but the content publisher preference(s) indicates the content 605b is to be indicated using displayed content).

In some situations, the delivery management component 525 may determine no device 110 of the user and/or group of users is capable of indicating the content 605b as preferred by either a user preference(s) or a content publisher preference(s). In such situations, the delivery management component 525 may cause the device(s) 110 of the user and/or group of users to indicate the content 605b according to characteristics of the device(s) 110.

In some situations, while the device(s) 110 is indicating the content 605b is available for output, the event bus 535 may receive additional content intended for the same user and/or group of users. Thus and in some embodiments, after receiving the event data 625, the delivery management component 525 may determine whether a device(s) 110 of the user and/or group of users is presently indicating the content 605b is available for output.

As part of the foregoing determination, the delivery management component 525 may determine a user and/or group identifier represented in the event data 625. If the event data 625 includes an encoded user and/or group identifier, the delivery management component 525 may perform one or more art-known/industry-known decoding techniques on the encoded user and/or group identifier to determine the corresponding user and/or group identifier. If the event data 625 includes a unique identifier as described previously, the delivery management component 525 may use a table (including unique identifiers associated with respective user and/or group identifiers) to determine the unique identifier is associated with a particular user and/or group identifier.

After receiving or determining the user and/or group identifier, the delivery management component 525 may determine one or more device identifiers (e.g., device serial numbers) associated with the user and/or group identifier. In other words, the delivery management component 525 determines one or more device identifiers corresponding to one or more devices 110 registered to a user and/or group of users corresponding to the user and/or group identifier.

Thereafter, the delivery management component 525 may determine whether at least one of the one or more device identifiers is associated with data (e.g., a flag or other indicator) representing a device(s) 110 is presently indicating content is available for output. If the delivery management component 525 determines a device(s) 110 is presently indicating content is available for output, the delivery management component 525 may cease processing with respect to the event data 625 (and not send an additional command(s) to the device(s) 110). Conversely, if the delivery management component 525 determines no devices 110 of the user and/or group of users are presently indicating content is available for output, the delivery management component 525 may determine how the content 605b is to be indicated to the user and/or group of users (as described herein above).

Referring to FIG. 7, sometime while the at least one device 110 of the user and/or group of users is indicating the content 605b is available for output, a device 110 of the user and/or group of users may receive a user input to output content(s) of the user and/or group of users. For example, the device 110 may receive audio corresponding to a spoken user input to output content(s). An example of such a spoken user input may be "what are my notifications," "output my notifications," and the like. For further example, the device 110 may receive a textual (e.g., typed) natural language user input to output content(s). In another example, the device 110 may include or otherwise be associated with a camera that captures a sequence of images representing the user 5 performing a gesture (an example of a user input) to output content(s). In a further example, the device 110 may include a button or display a virtual button (or other graphical user interface (GUI) element capable of being interacted with by the user 5), and the device 110 may detect the user 5 interacting with the button or other GUI element (an example of a user input) to output content(s).

In some embodiments, the device 110 may send data, representing the user input, to the system 120 for processing. In some instances, the device 110 may be configured to communicate with (i.e., send data to and received data from) the system 120 via an application installed on the device 110 and associated with the system 120. Such an application may be referred to as a companion application. An example of such an application is the Amazon Alexa application that may be installed on a smart phone or tablet.

The device 110 and/or system 120 processes data representing the user input (e.g., audio data representing a spoken user input, text data representing a text-based natural language user input, data representing a performed gesture, data representing a button interaction, etc.) to determine skill input data (e.g., NLU output data) representing the user input requests content(s) be output, and including a user and/or group identifier associated with the device 110 (that captured the user input) and/or user 5 (that provided the user input). In response, the device 110/system 120 may send the skill input data to a notification skill 125b.

The notification skill 125b processes the skill input data to determine the skill input data represents content(s) is to be output, and includes the user and/or group identifier. In response to such processing, the notification skill 125b generates request data 705 including the user and/or group identifier and requesting content(s) associated with the user and/or group identifier. The notification skill 125b sends the request data 705 to the content rendering component 530 of the notification system 410.

In response to receiving the request data 705, the content rendering component 530 queries the content storage 710 for content associated with the user and/or group identifier represented in the request data 705. In response, the content rendering component 530 receives at least the content 605b.

Since the content 605b may not be output until after the user or group of users is notified of the content 605b, it will be appreciated that a duration of time may occur between when the notification system 410 stores the content 605b in the content storage 610 and when the notification skill 125b sends the request data 705 to the content rendering component 530. In some situations, the content 605b may be outdated or otherwise need updating prior to being output.

In view of the foregoing, the content rendering component 530 may determine the content 605b was received from first content publisher 600 (e.g., based on an identifier of the content publisher 600 being associated with the content 605b in the content storage 610). Thereafter, the content rendering component 530 may send an update content request to the content publisher 600. The update content request may include an identifier uniquely identifying the content 605b to the content publisher 600. In some embodiments, this identifier may be represented in the metadata associated with the content 605a/605b. In some embodiments, the content rendering component 530 may send the update content request via a serial peripheral interface (SPI). As such, if the content rendering component 530 receives multiple contents from the content storage 610, the content rendering component 530 may send a respective update content request to two or more different content publishers via the SPI.

In response to receiving the update content request, the content publisher 600 may determine the content 605b as stored by the content publisher 600, and may generate updated content 715 therefrom. In some embodiments, the updated content 715 may be in a structured, non-natural language format. In some embodiments, the updated content 715 may be in a natural language format. In some embodiments, the content publisher 600 may perform art-known/industry-known natural language generation processing to generate the updated content 715.

The content publisher 600 may generate the updated content 715 based on information that became available to the content publisher 600 after the content publisher 600 sent the content 605a to the notification system 410.

In some embodiments, in response to receiving the update content request, the content publisher 600 may determine additional content that became available after sending the content 605a to the notification system 410. In such embodiments, the content publisher 600 may perform natural language generation (or other) processing to generate the updated content 715 to correspond to the content 605*b* and the additional content. For example, if the content 605*b* indicates tax information of a determined taxi, the additional content may be an estimated arrival time of the taxi.

In some embodiments, the content rendering component 530 may determine a rating associated with a content publisher (or other value representing the content publisher will generate the updated content 715 without including profanity or other adult-only content), and may send the update content request to the content publisher if the rating (or other value) satisfies a condition (e.g., meets or exceeds a threshold rating/value). Such processing configures the content rendering component 530 to send an update content request to a content publisher trusted by the content rendering component 530, as in some embodiments the content rendering component 530 may not be configured to check the updated content 715 for profanity or other adult-only content. The rating or other value may be based at least in part on user feedback data received from users of the system 100 with respect to previous data generated by the content publisher.

In some embodiments, the content publisher 600 may not generate the updated content 715 in response to receiving the update content request (e.g., in situations wherein the content publisher 600 is unaware of any updated or additional content).

In some embodiments, rather than sending the content 605*a* to the event bus 535, the content publisher 600 may send, to the event bus 535, data indicating the content publisher 600 wants content to be output to the user or group of users. In such embodiments and in response to receiving the request data 705, the content rendering component 530 may query the content publisher 600 for content, and the content publisher 600 may in turn send the updated content 715 to the content rendering component 530.

The content rendering component 530 sends, to the notification skill 125*b*, content 725. In some embodiments, the content 725 may correspond to the content 605*b* (e.g., in the situation where the content publisher 600 does not send the updated content 715 to the content rendering component 530). In at least some embodiments, the content 725 may corresponds to the updated content 715.

Additionally, in response to receiving the request data 705, the content rendering component 530 may query a user/group preference storage 710 (which may be stored by the notification system 410) for user/group preference data 735 associated with the user and/or group identifier, and may send the user/group preference data 735 to the notification skill 125*b*. The user/group preference data 735 may represent one or more user/group preferences for ordering the output of contents. For example, a user/group preference may represent a certain content topic is to be output prior to any other content topic. For further example, a user/group preference may represent a first content topic is to be output prior to a second content topic.

The user/group preference data 735 may represent one or more user/group preferences regarding output of content on specific device types. For example, a user/group preference may represent content is to be output using a specific device type, using a specific output type (e.g., synthesized speech, displayed content, etc.), and/or at a specific time of day.

Whereas the content rendering component 530 may be configured to send all data, required to output content, to the notification skill 125*b*, the notification skill 125*b* may be configured to construct the output to the user. The notification skill 125*b* may generate an ordering (of the contents) based on the user/group preference data 735 and/or one or more default ordering rules (which may order contents based on content topic). In some embodiments, the notification skill 125*b* may implement a rules engine that processes the user/group preference data 735 and the default ordering rule(s) to determine the ordering. In some embodiments, the notification skill 125*b* may implement a heuristics-based algorithm (or other type of algorithm) that takes into consideration the user/group preference data 735 and the default ordering rule(s) for determining the ordering. In at least some embodiments, the notification skill 125*b* may implement a machine learning model that processes the user/group preference data 735 and the default ordering rule(s) to determine the ordering.

The notification skill 125*b* may determine how the contents should be output. For example, the notification skill 125*b* may determine the contents should be output as synthesized speech. For further example, the notification skill 125*b* may determine the contents should be displayed. In another example, the notification skill 125*b* may determine the contents should be both output as synthesized speech and displayed.

The notification skill 125*b* may determine the content 605*b*, or the updated content 715, should not be output based on how the contents are to be output. For example, the notification skill 125*b* may determine the user/group preference data 735 indicates a content topic is to be output using a specific mechanism (e.g., synthesized speech and/or displayed), may determine the content 725 corresponds to the content topic, determine the content 725 is to be output using a mechanism other than the user/group preferred mechanism, and based thereon determine the content 725 should not be output.

In some embodiments, the notification skill 125*b* may determine content to be output was received by the notification skill 125*b* in a structured, non-natural language format. In some embodiments, the notification skill 125*b* may use an art-known/industry-known template-based approach to generate natural language content corresponding to the structured, non-natural language content. In some embodiments, the notification skill 125*b* may use an art-known/industry-known natural language generation processing-based approach to generate natural language content corresponding to the structured, non-natural language content.

In embodiments where the notification skill 125*b* determines the contents are to be output as audio, the notification skill 125*b* may send a respective natural language representation of each content to be output to the TTS component 180, and the TTS component 180 may perform TTS processing on each instance of natural language content to generate different instances of audio data including synthesized speech corresponding to respective natural language content. The notification skill 125*b* may then cause the different audio data (corresponding to the different natural language synthesized speech of the different contents) to be sent to the device 110 (in situations wherein the notification skill 125*b* is not implemented by the device 110) and output by the device 110 in the order determined by the notification skill 125*b*. This may include the notification skill 125*b* causing order data to be sent to the device 110, with the order data representing the order determined by the notification skill 125*b*.

In some embodiments, the notification skill 125*b* may generate ordered natural language contents corresponding to the different instances of the natural language content in the order determined by the notification skill 125*b*. In such embodiments, the notification skill 125b may send the ordered natural language contents to the TTS component 180, and the TTS component 180 may perform TTS processing on the ordered natural language contents to generate a single instance of audio data including synthesized speech corresponding to the ordered natural language content. The notification skill 125b may then cause the audio data to output by the device 110.

Additionally or alternatively, the notification skill 125b may determine the natural language contents are to be displayed as natural language text. In such embodiments, the notification skill 125b may cause different instances of natural language text data (each corresponding to a different instance of natural language content) to be displayed by the device 110 (using a display of or otherwise associated with the device 110) in the order determined by the notification skill 125b. This may include the notification skill 125b causing order data to be sent to the device 110, with the order data representing the order determined by the notification skill 125b. In some embodiments, the notification skill 125b may send a single instance of natural language text data (corresponding to the ordered natural language contents) to be sent to the device 110 for output. In some embodiments, the device 110 may display natural language text (corresponding to different contents) in a list format.

In some embodiments, the notification skill 125b may cause one or more devices, associated with the same user and/or group profile data as the device 110 that captured the user input requesting content be output, to output the foregoing synthesized speech and/or display the foregoing natural language text.

The following is a general description of possible components of the system 120 and device 110. The various components of the system 120 may be located on a same or different physical devices. Communication between various components may occur directly or across a network(s) 199.

A microphone or array of microphones (of or otherwise associated with a device 110) may capture audio 107 (illustrated in FIG. 1). The device 110 processes audio data 811 (illustrated in FIG. 8), representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data 811 representing the audio 107, the device 110 may determine if the speech is directed at the device 110/system 120. In at least some embodiments, such determination may be made using a wakeword detection component 820 (shown in FIG. 8). The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data 811, representing the audio, is analyzed to determine if specific characteristics of the audio data 811 match preconfigured acoustic waveforms, audio signatures, or other data corresponding to a wakeword.

Thus, the wakeword detection component 820 may compare the audio data 811 to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 820 detects a wakeword, the device 110 may "wake" and begin transmitting the audio data 811, representing the audio, to the system 120 (e.g., step 1 in FIG. 1). The audio data 811 may include data corresponding to the detected wakeword, or the device 110 may remove the portion of the audio corresponding to the detected wakeword prior to sending the audio data 811 to the system 120.

The orchestrator component 130 may receive the audio data 811 from the device 110, and send the audio data 811 to the ASR component 150.

The ASR component 150 transcribes the audio data 811 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data. Each ASR hypothesis may be associated with a score representing a confidence of ASR processing performed to determine the ASR hypothesis with which the score is associated.

The ASR component 150 interprets the speech in the audio data based on a similarity between the audio data and pre-established language models. For example, the ASR component 150 may compare the audio data with models for sounds (e.g., subword units, such as phonemes, etc.) and sequences of sounds to identify words that match the sequence of sounds of the speech represented in the audio data.

The NLU component 160 processes the ASR output data to determine NLU output data including one or more NLU hypotheses. The NLU component 160 may perform intent classification (IC) processing on ASR output data to determine an intent of the user input. An intent corresponds to an action to be performed that is responsive to the user input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in the ASR output data to the words and phrases in an intents database. In some embodiments, the NLU component 160 may communicate with multiple intents databases, with each intents database corresponding to one or more intents associated with a particular skill 125.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 160 may also perform named entity recognition (NER) processing on the ASR output data to determine one or more portions, sometimes referred to as slots or entities, of the user input that may be needed for post-NLU processing (e.g., processing performed by a skill). For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data that the NLU component 160 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

As described above, the system 120 may perform speech processing using two different components (e.g., the ASR component 150 and the NLU component 160). In at least some embodiments, the system 120 may implement a spoken language understanding (SLU) component configured to process audio data to determine NLU output data.

The SLU component may be equivalent to a combination of the ASR component 150 and the NLU component 160. Yet, the SLU component may process audio data and directly determine the NLU output data, without an intermediate step of generating ASR output data. As such, the SLU component may take audio data representing speech and attempt to make a semantic interpretation of the speech. That is, the SLU component may determine a meaning associated with the speech and then implement that meaning. For example, the SLU component may interpret audio data representing speech from the user 105 in order to derive a desired action. The SLU component may output NLU output data including a most likely NLU hypothesis, or multiple NLU hypotheses associated with respective confidence or other scores (such as probability scores, etc.).

The TTS component 180 generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The user recognition component 195 may recognize a user, as providing a user input, using various data. The user recognition component 195 may take as input the audio data 811. The user recognition component 195 may perform user recognition by comparing speech characteristics, in the audio data 811, to stored speech characteristics of users. The user recognition component 195 may additionally or alternatively perform user recognition by comparing biometric data (e.g., fingerprint data, iris data, retina data, etc.), received by the system 120 in correlation with a user input, to stored biometric data of users. The user recognition component 195 may additionally or alternatively perform user recognition by comparing image data (e.g., including a representation of at least a feature of a user), received by the system 120 in correlation with a user input, with stored image data including representations of features of different users. The user recognition component 195 may perform other or additional user recognition processes, including those known in the art. For a particular user input, the user recognition component 195 may perform processing with respect to stored data of users associated with the device 110 that received the user input.

The user recognition component 195 determines whether a user input originated from a particular user. For example, the user recognition component 195 may determine a first value representing a likelihood that a user input originated from a first user, a second value representing a likelihood that the user input originated from a second user, etc. The user recognition component 195 may also determine an overall confidence regarding the accuracy of user recognition processing.

The user recognition component 195 may output a single user identifier corresponding to the most likely user that originated the user input. Alternatively, the user recognition component 195 may output multiple user identifiers (e.g., in the form of an N-best list) with respective values representing likelihoods of respective users originating the user input. The output of the user recognition component 195 may be used to inform ASR processing, NLU processing, skill selection processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's user inputs. If a user does not enable a skill 125, the system 120 may not execute the skill 125 with respect to the user's user inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The skill session component 175 is configured to determine a skill 125, to execute to respond to the user input, based on the NLU output data determined by the NLU component 160 for the user input. The skill selection component 175 may include a skill proposal component, a skill pre-response component, and a skill ranking component.

The skill proposal component is configured to determine skills 125 capable of processing in response to the user input. In addition to receiving the NLU output data, the skill proposal component may also receive context data corresponding to the user input. For example, the context data may indicate a skill that was causing the device 110 to output content (e.g., music, video, synthesized speech, etc.) when the device 110 captured the user input, one or more skills that are indicated as enabled in a profile (as stored in the profile storage 170) associated with the user 105, output capabilities (which may be represented as a device type identifier) of the device 110, a geographic location of the device 110, and/or other context data available to the system 120 and corresponding to the user input.

The skill proposal component may implement skill proposal rules. A skill developer (via a skill developer device) may provide one or more rules representing when the skill developer's skill should be invoked to respond to a user input. In at least some embodiments, such a rule may be specific to an intent. In such embodiments, if a skill 125 is configured to execute with respect to multiple intents, the skill 125 may be associated with more than one rule (e.g., each rule corresponding to a different intent capable of being handled by the 125). In addition to being specific to an intent, a rule may indicate one or more entity identifiers with respect to which the skill should be invoked. For further example, a rule may indicate output capabilities of a device, a geographic location, and/or other conditions.

The system 120 may associate each skill 125 with each rule corresponding to the skill 125. As an example, the system 120 may store a rule indicating a video skill may execute when a user input corresponds to a "Play Video" intent and the device includes or is otherwise associated with a display. As another example, the system 120 may store a rule indicating a music skill may execute when a user input corresponds to a "PlayMusic" intent and music is being output by a device when the device captures the user input. It will be appreciated that other examples are possible. The foregoing rules enable skills to be differentially proposed at runtime, based on various conditions, in systems where multiple skills are configured to execute with respect to the same intent.

The skill proposal component, using the NLU output data, received context data, and the foregoing described skill proposal rules, determines skills 125 configured to process in response to the user input. Thus, in at least some embodiments, the skill proposal component may be implemented as a rules engine. In at least some embodiments, the skill proposal component may make binary (e.g., yes/no, true/false, etc.) determinations regarding whether a skill 125 is configured to process in response to the user input. For example, the skill proposal component may determine a skill 125 is configured to process, in response to the user input, if the skill 125 is associated with a rule corresponding to the intent (represented in the NLU output data) and the context data.

In at least some embodiments, the skill proposal component may make such binary determinations with respect to all skills 125 implemented by or otherwise in communication with the system 120. In at least some embodiments, the skill proposal component may make the binary determinations with respect to a portion of the skills 125 implemented by or otherwise in communication with the system 120 (e.g., skills 125 indicated as enabled in the user profile of the user 105).

After the skill proposal component is finished processing, the skill pre-response component is called to execute. The skill pre-response component is configured to query skills, determined by the skill proposal component as configured to process the user input, as to whether the skills are in fact able to respond to the user input. The skill pre-response component may take as input the NLU output data (input to the skill selection component 175) including one or more NLU hypotheses, where each of the one or more NLU hypotheses is associated with a particular skill determined by the skill proposal component as being configured to respond to the user input.

The skill pre-response component sends a pre-response query to each skill 125 determined by the skill proposal component. A pre-response query may include the NLU hypothesis (associated with the skill 125) and optionally other context data corresponding to the user input (e.g., device type of the device 110).

A skill 125 may determine, based on a received pre-response query (and optionally other data available to the skill 125), whether the skill 125 is capable of respond to the user input. For example, a skill 125 may generate a pre-response indicating the skill 125 can respond to the user input, indicating the skill 125 may be able to respond to the user input (e.g., the indicating the skill 125 needs more data to determine whether the skill 125 can respond to the user input), or indicating the skill 125 cannot respond to the user input (e.g., due to a present processing load of the skill 125).

In situations where a skill's pre-response indicates the skill 125 can or may be able to respond to the user input, the skill's pre-response may also include various other data representing a strength of the skill's potential response to the user input. Such other data may positively influence the skill's ranking by the skill ranking component of the skill selection component 175. For example, such other data may indicate capabilities (e.g., output capabilities or components such as a connected screen, loudspeaker, etc.) of a device to be used to output the skill's response; pricing data corresponding to a product or service the user input is requesting be purchased (or is requesting information for); availability of a product the user input is requesting be purchased; whether there are shipping fees for a product the user input is requesting be purchased; whether the user 105 already has a profile and/or subscription with the skill 125; that the user 105 does not have a subscription with the skill 125, but that there is a free trial/tier the skill 125 is offering; with respect to a taxi skill, a cost of a trip based on start and end locations, how long the user 105 would have to wait to be picked up, etc.; and/or other data available to the skill 125 that is related to the skill's processing of the user input. In at least some embodiments, a skill's pre-response may include an indicator (e.g., a flag) representing a strength of the skill's ability to personalize its response to the user input.

In at least some embodiments, a skill's pre-response may be configured to a schema pre-defined by the system 120. By the system 120 requiring pre-responses to conform to a specific schema (e.g., by requiring skills 125 to provide certain types of data in pre-responses), the system 120 may onboard new skills 125 into the skill selection functionality described herein without needing to reconfigure the skill selection component 175 each time a new skill 125 is onboarded. Moreover, requiring pre-responses to conform to a schema limits the amount of values needed to be used to train and implement a machine learning model for ranking skills 125.

After the skill pre-response component queries the skills 125 for pre-responses, the skill ranking component may be called to execute. The skill ranking component may be configured to select a single skill 125, from among the skills determined by the skill proposal component, to respond to the user input. In some embodiments, the skill ranking component may implemented a ML model. In at least some embodiments, the ML model may be a deep neural network (DNN).

The skill ranking component may take as input the NLU output data determined by the NLU component 160 and input to the skill selection component 175, the skill pre-responses received by the skill pre-response component, one or more preferences (e.g., skill preferences) of the user 105 (as represented in a user profile or group profile stored in the profile storage 170), NLU confidence scores of the NLU output data (as determined by the NLU component 160), a device type of the device 110, data indicating whether the device 110 was outputting content when the user input was received, and/or other context data available to the skill ranking component.

The skill ranking component ranks the skills 125 using the ML model. Things that may increase a skill's ranking include, for example, that the skill 125 is associated with a pre-response indicating the skill 125 can generate a response (to the user input) that is personalized to the user 105, that a NLU hypothesis corresponding to the skill 125 is associated with a NLU confidence score satisfying (e.g., meeting or exceeding) a condition (e.g., a threshold NLU confidence score), that the skill 125 was outputting content via the device 110 when the device 110 received the user input, etc. Things that may decrease a skill's ranking include, for example, that the skill 125 is associated with a pre-response indicating the skill 125 cannot generate a response (to the user input) that is personalized to the user 105, that a NLU hypothesis corresponding to the skill 125 is associated with a NLU confidence score failing to satisfy (e.g., failing to meet or exceed) a condition (e.g., a threshold NLU confidence score), etc.

The skill ranking component may generate a score for each skill determined by the skill proposal component, where the score represents a strength with which the skill ranking component recommends the associated skill 125 is to execute to respond to the user input. Such a confidence score may be a numeric score (e.g., between 0 and 1) or a binned score (e.g., low, medium, high). The skill ranking component may output a single skill selection hypothesis, indicating the top ranked skill and its corresponding NLU hypothesis, to the orchestrator component 130.

Figure 8:
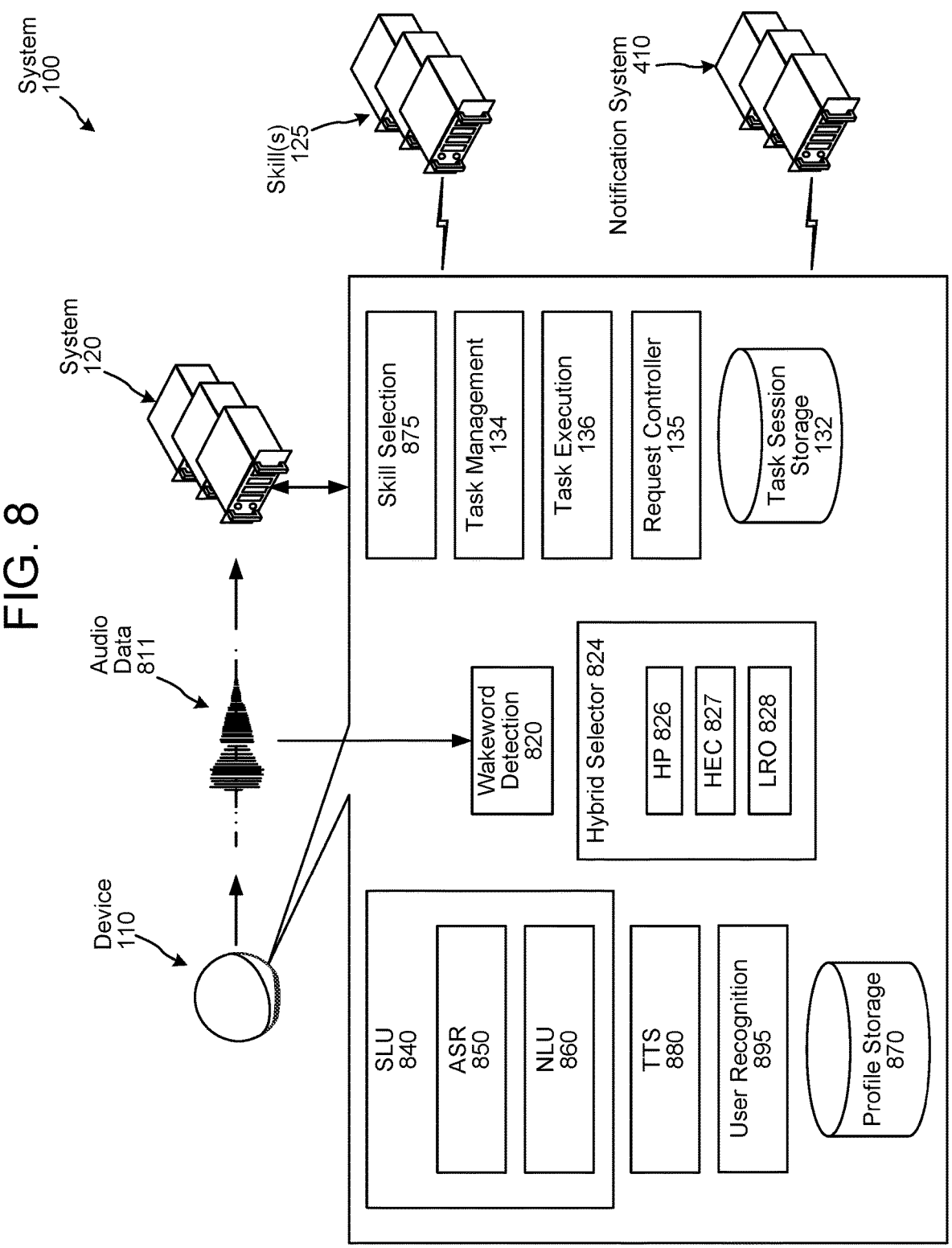
FIG. 8 is a conceptual diagram of components of a device, according to embodiments of the present disclosure.

The foregoing describes illustrative components and processing of the system 120. The following describes illustrative components and processing of the device 110. As illustrated in FIG. 8, in at least some embodiments the system 120 may receive the audio data 811 from the device 110, to recognize speech in the received audio data 811, and to perform functions in response to the recognized speech. In at least some embodiments, these functions involve sending directives (e.g., commands), from the system 120 to the device 110 to cause the device 110 to perform an action, such as output synthesized speech (responsive to the spoken user input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted previously, the device 110 may include a wakeword detection component 820 configured to used to detect a wakeword (e.g., "Alexa") that indicates to the device 110 that the audio data 811 is to be processed for determining NLU output data. In at least some embodiments, a hybrid selector 824, of the device 110, may send the audio data 811 to the wakeword detection component 820. If the wakeword detection component 820 detects a wakeword in the audio data 811, the wakeword detection component 820 may send an indication of such detection to the hybrid selector 824. In response to receiving the indication, the hybrid selector 824 may send the audio data 811 to the system 120 and/or an ASR component 850 implemented by the device 110. The wakeword detection component 820 may also send an indication, to the hybrid selector 824, representing a wakeword was not detected. In response to receiving such an indication, the hybrid selector 824 may refrain from sending the audio data 811 to the system 120, and may prevent the ASR component 850 from processing the audio data 811. In this situation, the audio data 811 can be discarded.

The device 110 may conduct its own speech processing using on-device language processing components (such as a SLU component 840, the ASR component 850, and/or a NLU component 860) similar to the manner discussed above with respect to the system-implemented SLU component XXA40, ASR component 150, and NLU component 160.

The device 110 may also internally include, or otherwise have access to, other components such as one or more skills 125, a user recognition component 895 (configured to process in a similar manner to the user recognition component 195 implemented by the system 120), a profile storage 870 (configured to store similar profile data to the profile storage 170 implemented by the system 120), a TTS component 880 (configured to process in a similar manner to the TTS component 180 implemented by the system 120), a skill selection component 875 (configured to process in a similar manner to the skill selection component 175 implemented by the system 120), the task management component 134, the task execution component 136, the request controller 135, the task session storage 132, and/or other components. In at least some embodiments, the profile storage 870 may store profile data for a user or group of users specifically associated with the device 110.

In at least some embodiments, the on-device language processing components may not have the same capabilities as the language processing components implemented by the system 120. For example, the on-device language processing components may be configured to handle a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the device 110 attempts to process a user input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 811 to pass to the system 120 while also receiving (e.g., intercepting) this audio data 811 and sending the audio data 811 to the HEC 827.

In at least some embodiments, the hybrid selector 824 may further include a local request orchestrator (LRO) 828 configured to notify the ASR component 850 about the availability of the audio data 811, and to otherwise initiate the operations of on-device language processing when the audio data 811 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 811 is received, the HP 826 may allow the audio data 811 to pass through to the system 120 and the HP 826 may also input the audio data 811 to the ASR component 850 by routing the audio data 811 through the HEC 827 of the hybrid selector 824, whereby the LRO 828 notifies the ASR component 850 of the audio data 811. At this point, the hybrid selector 824 may wait for response data from either or both the system 120 and/or the on-device language processing components. However, the disclosure is not limited thereto, and in some examples the hybrid selector 824 may send the audio data 811 only to the ASR component 850 without departing from the disclosure. For example, the device 110 may process the audio data 811 on-device without sending the audio data 811 to the system 120.

The ASR component 850 is configured to receive the audio data 811 from the hybrid selector 824, and to recognize speech in the audio data 811, and the NLU component 860 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 860) may be selected as usable to respond to a user input, and local response data may be sent to the hybrid selector 824, such as a "ReadyToExecute" response. The hybrid selector 824 may then determine whether to use directive data from the on-device components to respond to the user input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each user input. The device 110 may include the unique identifier when sending the audio data 811 to the system 120, and the response data from the system 120 may include the unique identifier to identify to which user input the response data corresponds.

In at least some embodiments, the device 110 may include one or more skills 125 that may process similarly to the system-implemented skill(s) 125. The skill(s) 125 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 9:
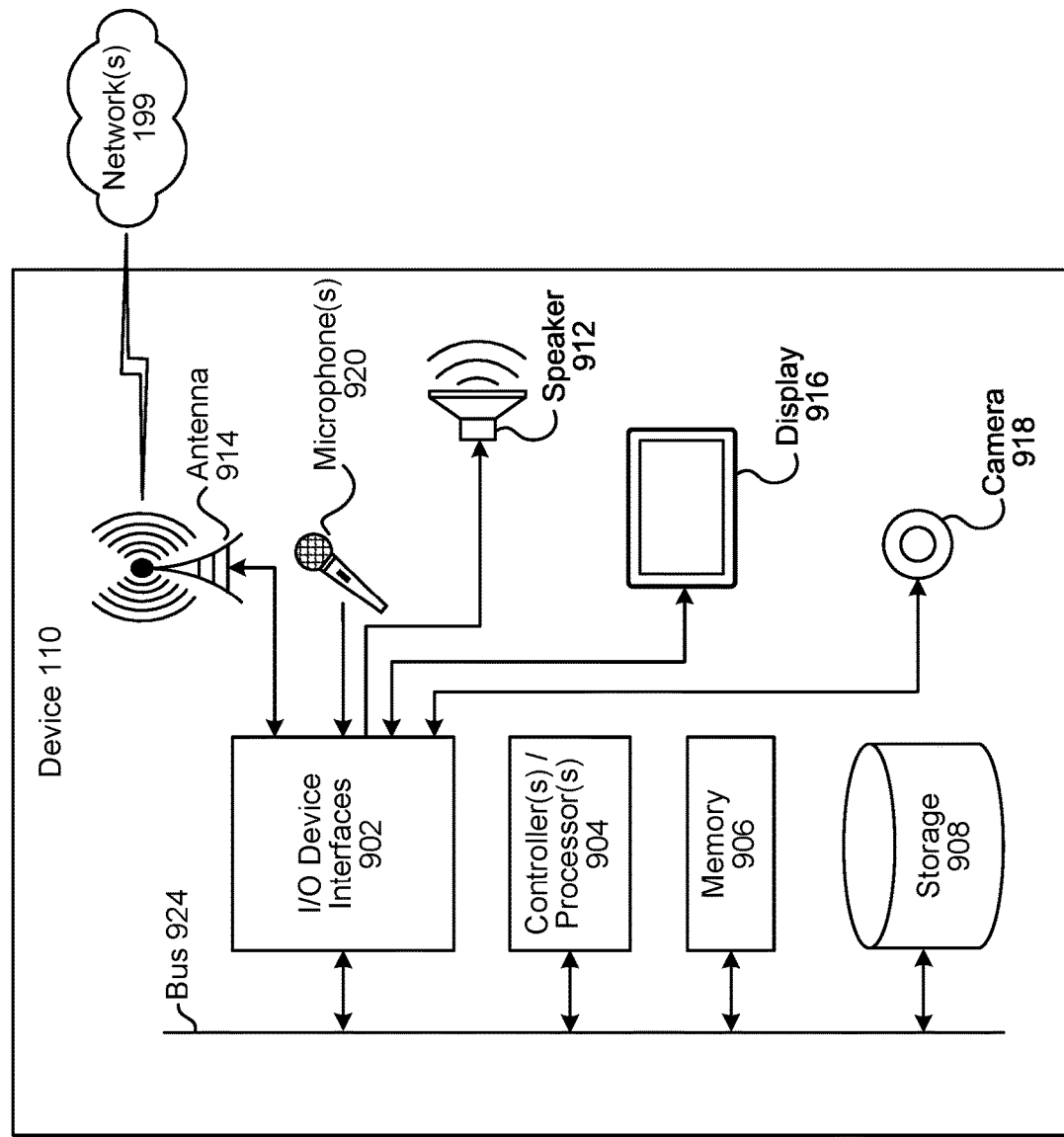
FIG. 9 is a block diagram conceptually illustrating example components of a device, according to embodiments of the present disclosure.
Figure 10:
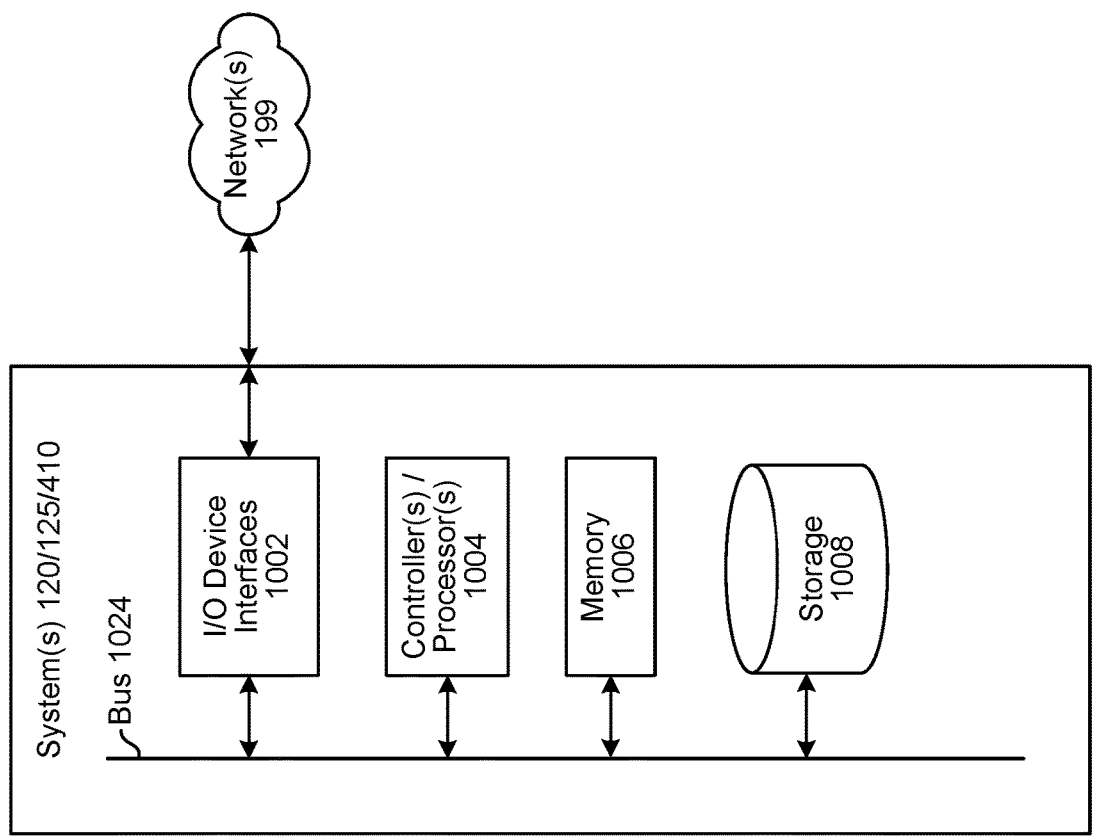
FIG. 10 is a block diagram conceptually illustrating example components of a system, according to embodiments of the present disclosure.

FIG. 9 is a block diagram conceptually illustrating a device 110 that may be used with the system 120. FIG. 10 is a block diagram conceptually illustrating example components of a remote device, such as the system 120, which may assist with ASR processing, NLU processing, etc.; and a skill 125. A system (120/125/410) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125/410) may be included in the system 100 of the present disclosure, such as one or more systems 120 for performing ASR processing, one or more systems 120 for performing NLU processing, and one or more skill 125, etc. In operation, each of these systems may include computer-readable and computer-executable instructions that reside on the respective device (120/125/410), as will be discussed further below.

Each of these devices (110/120/125/410) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125/410) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125/410) may also be connected to removable or external non-volatile memory and/or storage (such as a removable memory card, memory key drive, networked storage, etc.) through respective input/output device interfaces (902/1002).

Computer instructions for operating each device (110/120/125/410) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125/410) includes input/output device interfaces (902/1002). A variety of components may be connected through the input/output device interfaces (902/1002), as will be discussed further below. Additionally, each device (110/120/125/410) may include an address/data bus (924/1024) for conveying data among components of the respective device. Each component within a device (110/120/125/410) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or a skill 125 may include their own dedicated processors, memory, and/or storage. Alternatively, one or more of the components of the device 110, the system 120, and/or a skill 125 may utilize the I/O interfaces (902/1002), processor(s) (904/1004), memory (906/1006), and/or storage (908/1008) of the device(s) 110, system 120, or the skill 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill 125, as described herein, are illustrative, and may be located as a stand-alone device or may be included, in whole or in part, as a component of a larger device or system.

Figure 11:
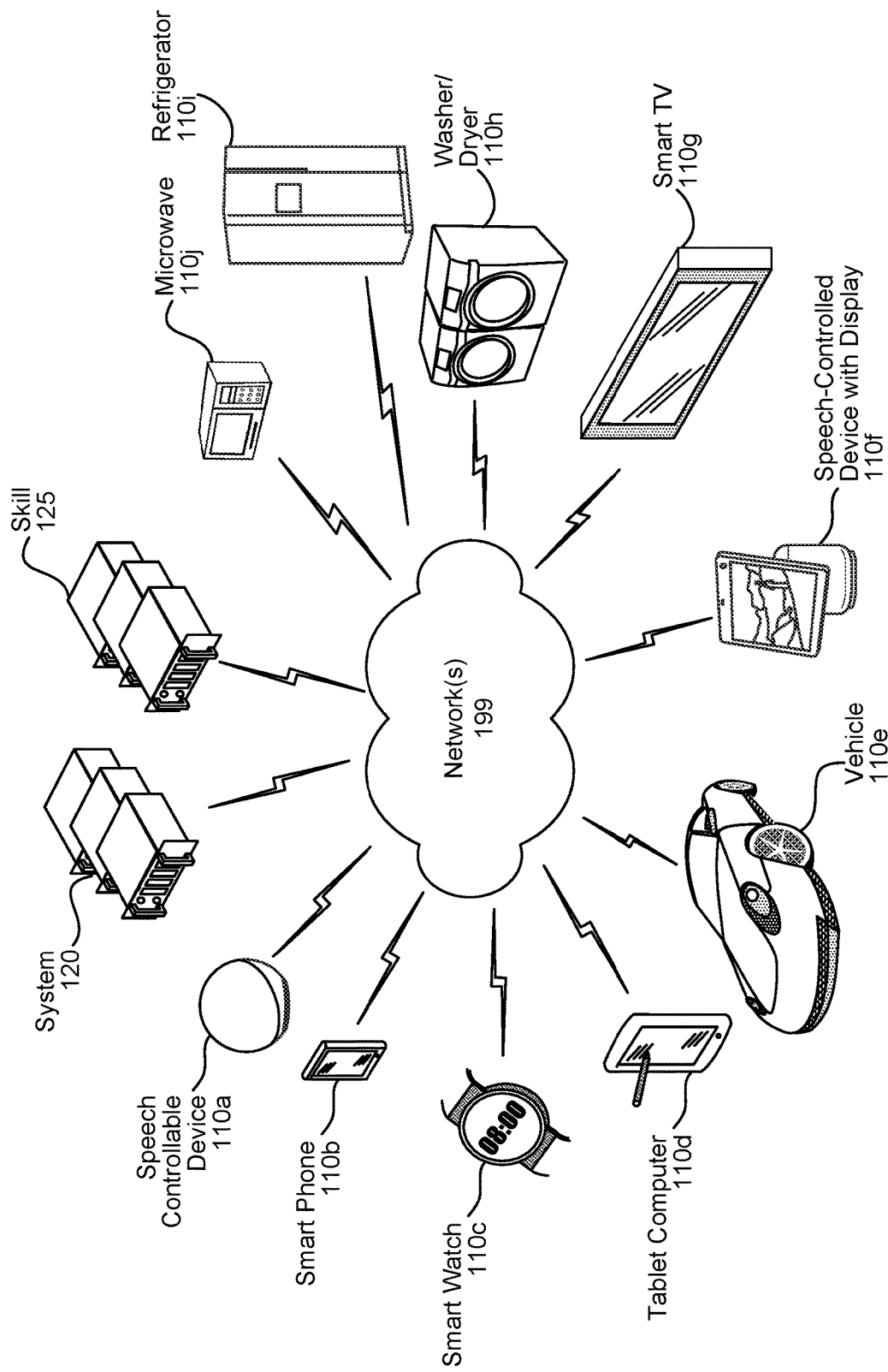
FIG. 11 illustrates an example of a computer network for use with the overall system, according to embodiments of the present disclosure.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a vehicle 110e, a speech-controlled device 110f with a display, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input audio data representing a first spoken user input, the input audio data being associated with a user profile identifier;
determining a skill configured to generate a response to the first spoken user input;
causing the skill to process with respect to the first spoken user input;
receiving, from the skill and after causing the skill to process, first data representing a first skill session is to be placed in a background state, the first skill session corresponding to processing of the first spoken user input;
storing, based on receiving the first data, an association between the first skill session and a background state indicator, wherein storing the association permits processing of a second spoken user input corresponding to a second skill session created for the user profile identifier while the first skill session is associated with the background state indicator;
receiving, after storing the association and from the skill, a request for the first skill session to be resumed;
determining the first skill session is to be resumed;
sending, to the skill and based on determining the first skill session is to be resumed, second data representing the first skill session will be resumed; and
sending, to the skill and based on determining the first skill session is to be resumed, a command to resume processing with respect to the first skill session.

2. The computer-implemented method of claim 1, further comprising:
receiving, from the skill, a second request for a third skill session to be resumed;
determining the user profile identifier is associated with the third skill session;
determining the user profile identifier is associated with a fourth skill session;
determining the fourth skill session is in an active state and is presently being used to process a third spoken user input associated with the user profile identifier; and
sending, to the skill and based on determining the fourth skill session is in the active state, third data representing the second request is denied and that the third skill session is to remain in the background state.

3. The computer-implemented method of claim 1, further comprising:
receiving, from the skill, a second request for a third skill session to be resumed;
determining the third skill session is to be resumed;
determining the user profile identifier is associated with the third skill session;
determining the user profile identifier is associated with a fourth skill session;
determining the fourth skill session is in an active state;
storing, based on determining the fourth skill session is in the active state, third data representing the third skill session is to be resumed;
determining, after storing the third data, that the fourth skill session is in a terminated state and is no longer usable to perform processing of spoken user inputs; and
sending, to the skill based on the third data and determining the fourth skill session is in the terminated state, a second command to resume processing with respect to the third skill session.

4. The computer-implemented method of claim 1, further comprising:
receiving, from the skill, a second request for a third skill session to be resumed;
determining the third skill session is to be resumed;
determining the user profile identifier is associated with the third skill session;
determining the user profile identifier is associated with a fourth skill session;
determining the fourth skill session is in an active state; and
sending, to a notification system and based on determining the fourth skill session is in the active state, third data representing the skill has requested the third skill session be resumed, wherein the notification system is configured to output content using the user profile identifier and indicating the skill has requested the third skill session be resumed.

5. A computer-implemented method comprising:
receiving input audio data representing a first spoken user input;
determining a skill configured to generate a response to the first spoken user input;
causing the skill to process with respect to the first user input;
receiving, from the skill and after causing the skill to process, first data representing a first skill session is to be placed in a background state, the first skill session corresponding to processing of the first user input;
storing an association between the first skill session and a background state indicator, wherein storing the association permits processing of a second user input corresponding to a second skill session;
receiving, after storing the association and from the skill, a request for the first skill session to be resumed; and
after receiving the request, sending, to the skill, a command to resume processing with respect to the first skill session.

6. The computer-implemented method of claim 5, further comprising:
receiving the request via a first application programming interface (API);
sending, to the skill via the first API, second data representing the first skill session will be resumed; and
sending the command to the skill via a second API.

7. The computer-implemented method of claim 5, further comprising:
determining second data corresponding to previous processing of the first skill session, the second data including a device identifier of a device that received a third user input associated with the first skill session; and
sending, to the device, a second command to transition from a low-power state to a high-power state.

8. The computer-implemented method of claim 5, further comprising:

determining a number of requests to resume skill sessions that have been received from the skill during a period of time; and determining, based on the number of requests, that the first skill session is to be resumed.

9. The computer-implemented method of claim 5, further comprising:
receiving, from the skill, a second request for a third skill session to be resumed;
determining a user profile identifier associated with the third skill session;
determining user profile data associated with the user profile identifier;
determining, using the user profile data, that the skill is unauthorized to resume the third skill session; and
sending, to the skill and based on determining the skill is unauthorized to resume the third skill session, second data representing the second request is denied.

10. The computer-implemented method of claim 5, further comprising:
receiving, from the skill, a second request for a third skill session to be resumed;
determining a user profile identifier associated with the second skill session;
determining the user profile identifier is associated with a fourth skill session;
determining the fourth skill session is in an active state; and
sending, to the skill and based on determining the fourth skill session is in the active state, second data representing the second request is denied.

11. The computer-implemented method of claim 5, further comprising:
receiving, from the skill, a second request for a third skill session to be resumed;
determining the third second skill session is associated with a device identifier of a device that received a third user input associated with the third skill session;
determining the device identifier is associated with a do not disturb mode; and
sending, to the skill and based on determining the device identifier is associated with the do not disturb mode, second data representing the second request is denied.

12. The computer-implemented method of claim 5, further comprising:
receiving, from the skill, a second request for a third skill session to be resumed;
determining a user profile identifier associated with the third skill session;
determining the user profile identifier is associated with a fourth skill session;
determining the fourth skill session is in an active state;
storing, based on determining the fourth skill session is in the active state, second data representing the third skill session is to be resumed;
determining, after storing the second data, that the fourth skill session is associated with a state different from the active state; and
sending, to the skill based on the second data and determining the fourth skill session is associated with the state different from the active state, a second command to resume processing with respect to the third skill session.

13. The computer-implemented method of claim 5, further comprising:
receiving, from the skill, a second request for a third skill session to be resumed;

determining the third skill session is to be denied; and
causing, based on determining the third skill session is to be denied, a notification system to output content indicating the skill has requested the third skill session be resumed.

14. A computing system comprising:
at least one processor; and
at least one memory comprising instructions that, when executed by the at least one processor, cause the computing system to:
receiving input audio data representing a first spoken user input;
determining a skill configured to generate a response to the first spoken user input;
receive, from a skill configured to generate a response to the first spoken user input of a skill session, a request for the skill session to be resumed, wherein the request is received in response to the skill determining output data responsive to the first spoken user input while the skill session is associated with a background state; and
after receiving the request, send, to the skill and without receiving a second user input requesting the skill session be resumed, a command to resume processing with respect to the skill session, wherein the command authorizes the skill to present to a user the output data generated while the skill session was associated with the background state.

15. The computing system of claim 14, wherein the at least one memory further comprises instructions that, when executed by the at least one processor, further cause the computing system to:
receive the request via a first application programming interface (API);
send, to the skill via the first API and based on determining the skill session is to be resumed, first data representing the skill session will be resumed; and
send the command to the skill via a second API.

16. The computing system of claim 14, wherein the at least one memory further comprises instructions that, when executed by the at least one processor, further cause the computing system to:
determine first data corresponding to previous processing of the skill session, the first data including a device identifier of a device that received a third user input associated with the skill session; and
send, to the device, a second command to transition from a low-power state to a high-power state.

17. The computing system of claim 14, wherein the at least one memory further comprises instructions that, when executed by the at least one processor, further cause the computing system to:
determine a number of requests to resume skill sessions that have been received from the skill during a period of time; and
determine, based on the number of requests, that the skill session is to be resumed.

18. The computing system of claim 14, wherein the at least one memory further comprises instructions that, when executed by the at least one processor, further cause the computing system to:
receive, from the skill, a second request for a second skill session to be resumed;
determine a user profile identifier associated with the second skill session;
determine user profile data associated with the user profile identifier;

determine, using the user profile data, that the skill is unauthorized to resume the second skill session; and send, to the skill and based on determining the skill is unauthorized to resume the second skill session, first data representing the second request is denied.

19. The computing system of claim 14, wherein the at least one memory further comprises instructions that, when executed by the at least one processor, further cause the computing system to:

receive, from the skill, a second request for a second skill session to be resumed;

determine a user profile identifier associated with the second skill session;

determine the user profile identifier is associated with a third skill session;

determine the third skill session is in an active state; and send, to the skill and based on determining the third skill session is in the active state, first data representing the second request is denied.

20. The computing system of claim 14, wherein the at least one memory further comprises instructions that, when executed by the at least one processor, further cause the computing system to:

receive, from the skill, a second request for a second skill session to be resumed;

determine the second skill session is associated with a device identifier of a device that received a third user input associated with the second skill session;

determine the device identifier is in a do not disturb mode; and send, to the skill and based on determining the device identifier is in the do not disturb mode, first data representing the second request is denied.

* * * * *